United States Patent
Lin et al.

(10) Patent No.: US 10,498,041 B1
(45) Date of Patent: Dec. 3, 2019

(54) MOBILE DEVICE AND ANTENNA STRUCTURE THEREIN

(71) Applicant: Wistron Corp., New Taipei (TW)

(72) Inventors: Hsieh-Chih Lin, New Taipei (TW); Yu-Chia Chang, New Taipei (TW); Wan Chu Wei, New Taipei (TW); Jung-Chin Hsieh, New Taipei (TW); Wen-Chieh Wu, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 16/162,310

(22) Filed: Oct. 16, 2018

(30) Foreign Application Priority Data

Jul. 6, 2018 (TW) ................................ 107123470 A

(51) Int. Cl.
*H04W 4/00* (2018.01)
*H01Q 13/16* (2006.01)
*H04M 1/02* (2006.01)

(52) U.S. Cl.
CPC ............ *H01Q 13/16* (2013.01); *H04M 1/026* (2013.01)

(58) Field of Classification Search
CPC .................................. H01Q 1/243; H01Q 9/42
See application file for complete search history.

(56) References Cited

U.S. PATENT DOCUMENTS

| | | | |
|---|---|---|---|
| 6,081,241 A | 6/2000 | Josefsson et al. | |
| 7,830,322 B1* | 11/2010 | Oliver | H01Q 21/064 343/700 MS |
| 9,843,092 B2 | 12/2017 | Tu et al. | |
| 2011/0241948 A1 | 10/2011 | Bevelacqua et al. | |
| 2013/0293425 A1* | 11/2013 | Zhu | H01Q 1/243 343/702 |
| 2015/0255851 A1 | 9/2015 | Guterman et al. | |
| 2017/0195467 A1* | 7/2017 | Chang | H04M 1/0264 |
| 2018/0310522 A1* | 11/2018 | Bancroft | A01K 11/007 |

FOREIGN PATENT DOCUMENTS

TW 201739234 A 11/2017

* cited by examiner

*Primary Examiner* — Omoniyi Obayanju

(57) ABSTRACT

A mobile device includes a host upper cover, a host lower cover, a metal cavity structure, an H-shaped slot antenna, and a feeding element. The metal cavity structure is coupled between the host upper cover and the host lower cover. The H-shaped slot antenna is formed on the host upper cover, the host lower cover, the metal cavity structure, the host upper cover and the metal cavity structure, or the host lower cover and the metal cavity structure. The feeding element is coupled to a signal source. The feeding element is configured to excite the H-shaped slot antenna.

17 Claims, 22 Drawing Sheets

MOBILE DEVICE AND ANTENNA STRUCTURE THEREIN

CROSS REFERENCE TO RELATED APPLICATIONS

This Application claims priority of Taiwan Patent Application No. 107123470 filed on Jul. 6, 2018, the entirety of which is incorporated by reference herein.

BACKGROUND OF THE INVENTION

Field of the Invention

The disclosure generally relates to a mobile device, and more particularly, to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

In order to improve their appearance, designers often incorporate metal elements into mobile devices. However, the newly added metal elements tend to negatively affect the operation of antennas used for wireless communication in mobile devices, thereby degrading the overall communication quality of the mobile devices. As a result, there is a need to propose a mobile device with a novel antenna structure, so as to overcome the problems of the prior art.

BRIEF SUMMARY OF THE INVENTION

In a preferred embodiment, the invention is directed to a mobile device including a host upper cover, a host lower cover, a metal cavity structure, an H-shaped slot antenna, and a feeding element. The metal cavity structure is coupled between the host upper cover and the host lower cover. The H-shaped slot antenna is formed on the host upper cover, the host lower cover, the metal cavity structure, the host upper cover and the metal cavity structure, or the host lower cover and the metal cavity structure. The feeding element is coupled to a signal source. The feeding element is configured to excite the H-shaped slot antenna.

In some embodiments, the host upper cover and the host lower cover are made of metal materials.

In some embodiments, the metal cavity structure is adjacent to the edge of the host upper cover and the edge of the host lower cover.

In some embodiments, the metal cavity structure includes a first metal partition, a second metal partition, a third metal partition, and a fourth metal partition. The first metal partition is aligned with the edge of the host upper cover and the edge of the host lower cover.

In some embodiments, the H-shaped slot antenna has a connection slot, a first slot, and a second slot. The connection slot is connected between the first slot and the second slot.

In some embodiments, each of the first slot and the second slot substantially has a straight-line shape.

In some embodiments, the length of the second slot is substantially equal to the length of the first slot.

In some embodiments, the first slot and the second slot are positioned at the host upper cover.

In some embodiments, the feeding element extends across the first slot.

In some embodiments, the first slot is positioned at the host upper cover, and the second slot is positioned at the first metal partition.

In some embodiments, the feeding element extends across the first slot or the second slot.

In some embodiments, the second slot further includes a widening portion, and the widening portion is adjacent to the edge of the host upper cover.

In some embodiments, the mobile device further includes a circuit element. The circuit element is configured to fine-tune the impedance matching of the H-shaped slot antenna.

In some embodiments, the circuit element is a capacitor or an inductor.

In some embodiments, the circuit element is coupled between two opposite sides of the first slot.

In some embodiments, the feeding element is coupled through the circuit element to the host upper cover or the first metal partition.

In some embodiments, the H-shaped slot antenna covers a first frequency band from 2400 MHz to 2500 MHz, and a second frequency band from 5150 MHz to 5850 MHz.

In some embodiments, the length of each of the first slot and the second slot is shorter than 0.4 wavelength of the first frequency band.

In some embodiments, the H-shaped slot antenna has a first resonant path from a first end of the first slot through the connection slot to a first end of the second slot. The first resonant path is excited to generate the first frequency band.

In some embodiments, the H-shaped slot antenna further has a second resonant path from a second end of the first slot through the connection slot to a second end of the second slot. The second resonant path is excited to generate the second frequency band.

BRIEF DESCRIPTION OF DRAWINGS

The invention can be more fully understood by reading the subsequent detailed description and examples with references made to the accompanying drawings, wherein.

DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
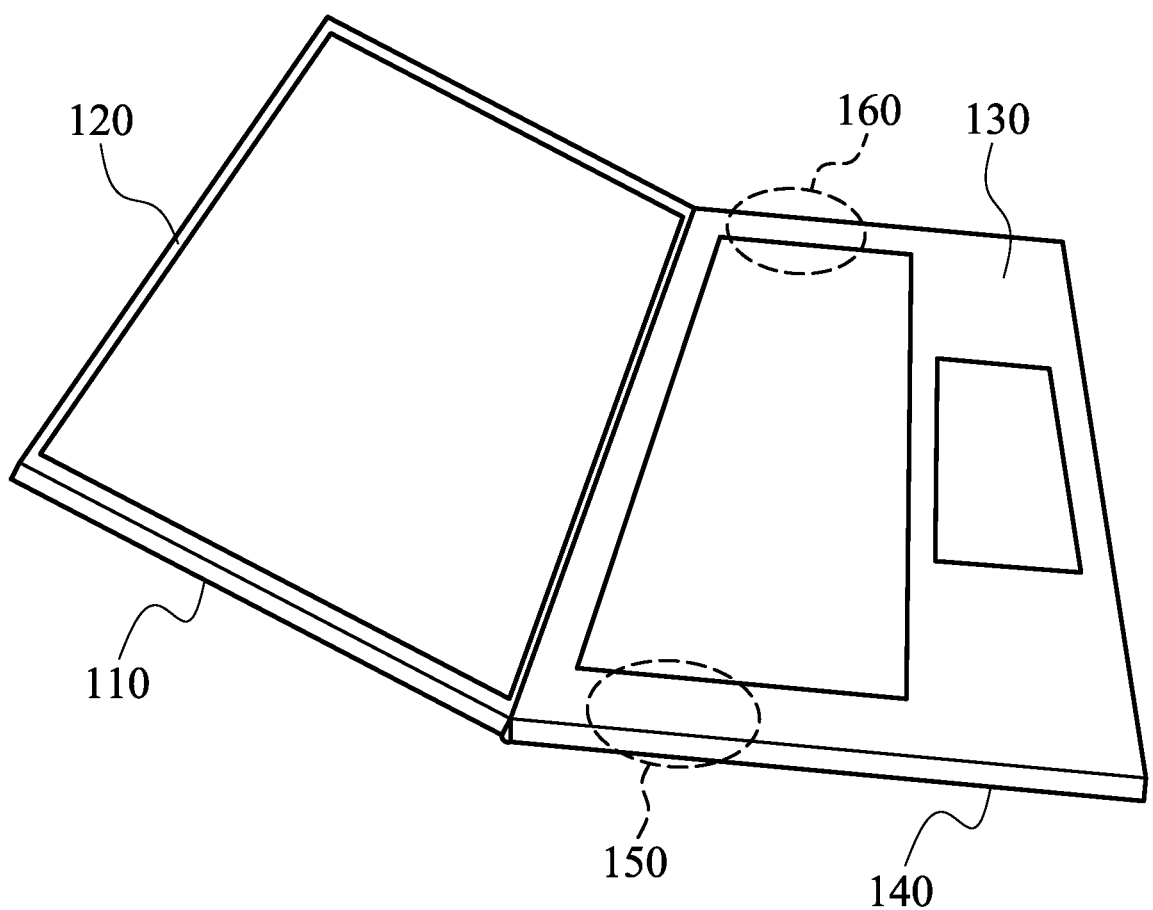
FIG. 1 is a perspective view of a mobile device according to an embodiment of the disclosure.

FIG. 1 is a perspective view of a mobile device 100 according to an embodiment of the disclosure. The mobile device 100 may be a notebook computer. As shown in FIG. 1, the mobile device 100 includes a back cover 110, a display frame 120, a host upper cover 130, and a host lower cover 140. It should be noted that the back cover 110, the display frame 120, the host upper cover 130, and the host lower cover 140 are equivalent to the so-called "A component", "B-component", "C-component", and "D-component" in the technical field of notebook computers, respectively.

Figure 2A:
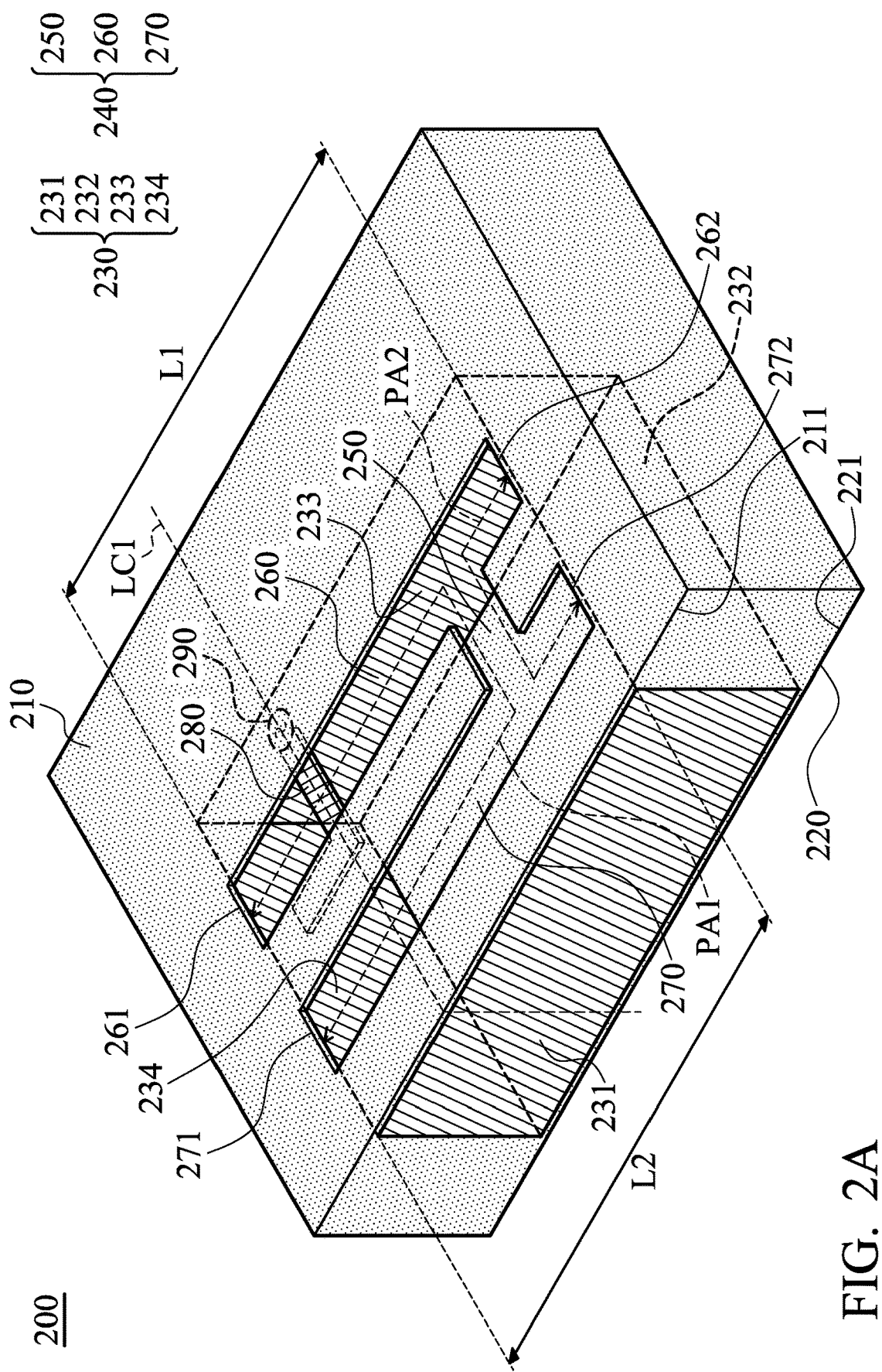
FIG. 2A is a partial perspective view of a mobile device according to an embodiment of the disclosure.
Figure 2B:
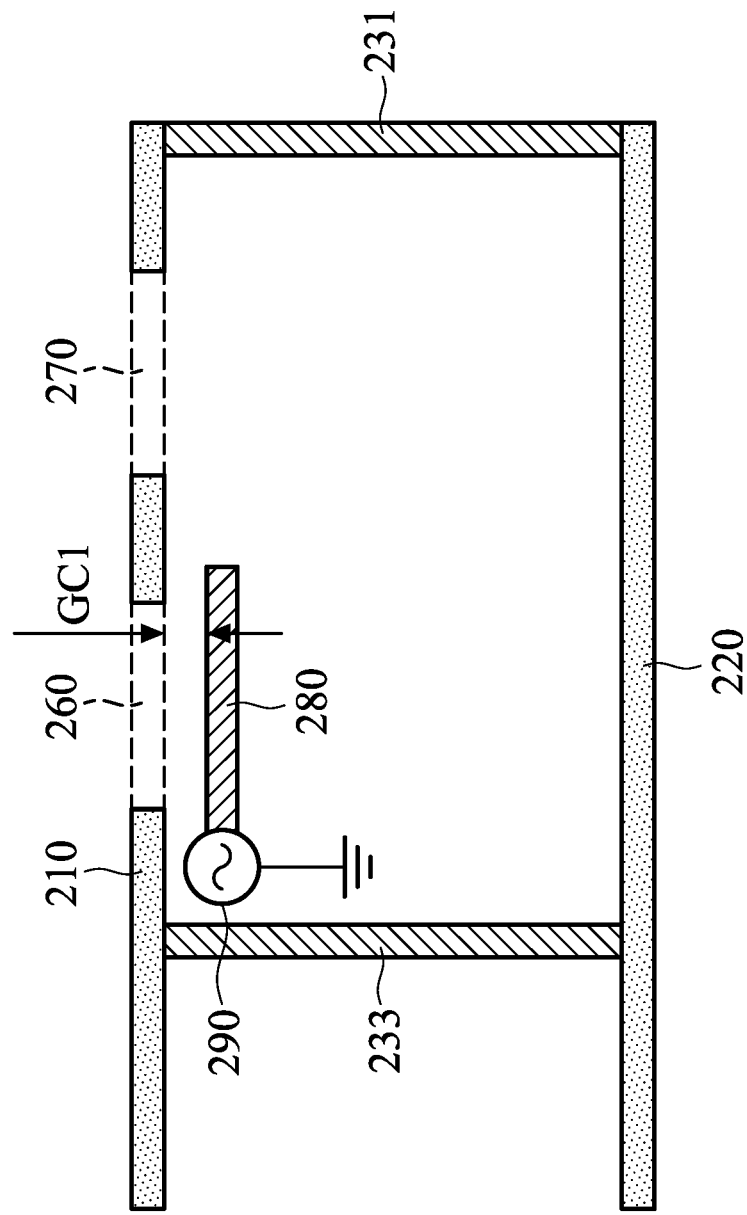
FIG. 2B is a sectional view of a mobile device according to an embodiment of the disclosure.

FIG. 2A is a partial perspective view of a mobile device 200 according to an embodiment of the disclosure. FIG. 2B is a sectional view of the mobile device 200 (along a sectional line LC1 of FIG. 2A) according to an embodiment of the disclosure. Please refer to FIG. 2A and FIG. 2B together. The mobile device 200 may be a notebook computer. In the embodiment of FIG. 2A and FIG. 2B, the mobile device 200 includes a host upper cover 210, a host lower cover 220, a metal cavity structure 230, an H-shaped slot antenna 240, and a feeding element 280. In other embodiments, the mobile device 200 further includes other components, such as a back cover, a display frame, a processor, a display device, a storage device, and a battery module, although they are not displayed in FIG. 2A and FIG. 2B.

Each of the host upper cover 210, the host lower cover 220, and the feeding element 280 is at least partially or completely made of a metal material. The metal cavity structure 230 is directly coupled between the host upper cover 210 and the host lower cover 220. For example, the metal cavity structure 230 may be adjacent to an edge 211 of the host upper cover 210 and an edge 221 of the host lower cover 220. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing therebetween is reduced to 0).

In some embodiments, the metal cavity structure 230 includes a first metal partition 231, a second metal partition 232, a third metal partition 233, and a fourth metal partition 234. Any adjacent two of the aforementioned metal partitions are coupled to each other, so as to form a rectangular loop structure. The first metal partition 231 is positioned between the edge 211 of the host upper cover 210 and the edge 221 of the host lower cover 220. The first metal partition 231 is aligned with the edge 211 of the host upper cover 210 and the edge 221 of the host lower cover 220. A hollow portion of the metal cavity structure 230 may be surrounded by the host upper cover 210, the host lower cover 220, the first metal partition 231, the second metal partition 232, the third metal partition 233, and the fourth metal partition 234. The shape of the hollow portion is not limited in the disclosure. For example, the hollow portion of the metal cavity structure 230 may be substantially a cuboid. However, in other embodiments, the hollow portion of the metal cavity structure 230 may be substantially a triangular cylinder or a half cylinder, without affecting the performance of the disclosure.

The H-shaped slot antenna 240 is formed on the host upper cover 210, the metal cavity structure 230, or both of the host upper cover 210 and the metal cavity structure 230. For example, the H-shaped slot antenna 240 may be positioned at a first side 150 or a second side 160 of the notebook computer of FIG. 1, but it is not limited thereto. The feeding element 280 may be an independent ironware element, or a metal trace disposed on a PCB (Printed Circuit Board) or an FCB (Flexible Circuit Board). In some embodiments, the feeding element 280 substantially has an L-shape or a straight-line shape. The feeding element 280 is coupled to a signal source 290, such as an RF (Radio Frequency) module.

The feeding element 280 is configured to directly or indirectly excite the H-shaped slot antenna 240.

Specifically, the H-shaped slot antenna 240 has a connection slot 250, a first slot 260, and a second slot 270. The connection slot 250 is connected between the first slot 260 and the second slot 270. In the embodiment of FIG. 2A and FIG. 2B, the connection slot 250, the first slot 260, and the second slot 270 are all positioned at the host upper cover 210. Each of the first slot 260 and the second slot 270 may substantially have a straight-line shape. The first slot 260 and the second slot 270 may be substantially parallel to each other. The length L2 of the second slot 270 may be substantially equal to the length L1 of the first slot 260. Specifically, the first slot 260 has a first end 261 and a second end 262, both of which are closed ends. The second slot 270 has a first end 271 and a second end 272, both of which are closed ends. The first end 271 of the second slot 270 is adjacent to the first end 261 of the first slot 260. The second end 272 of the second slot 270 is adjacent to the second end 262 of the first slot 260. The feeding element 280 may extend across the first slot 260, but may not extend across the second slot 270. A coupling gap GC1 is formed between the feeding element 280 and the first slot 260. In other words, the feeding element 280 has a vertical projection on the host upper cover 210, and the vertical projection at least partially overlaps the first slot 260 but does not overlap the second slot 270 at all. The feeding element 280 is relatively close to the first end 261 of the first slot 260 and is relatively far away from the second end 262 of the first slot 260. For example, the feeding element 280 may be substantially positioned between the connection slot 250 and the first end 261 of the first slot 260.

Figure 2C:
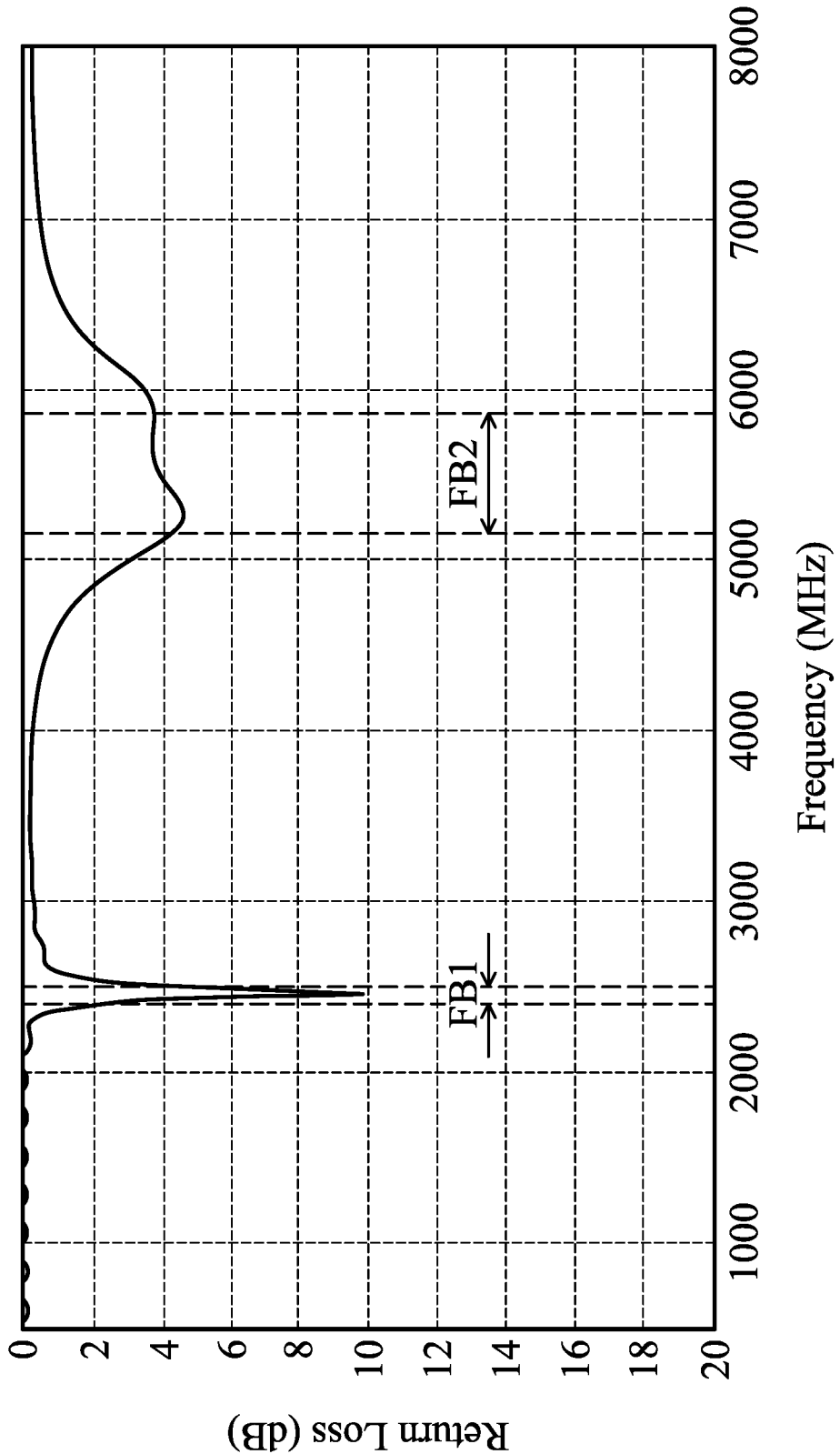
FIG. 2C is a diagram of return loss of an H-shaped slot antenna of a mobile device according to an embodiment of the disclosure.

FIG. 2C is a diagram of return loss of the H-shaped slot antenna 240 of the mobile device 200 according to an embodiment of the disclosure. According to the measurement of FIG. 2C, the H-shaped slot antenna 240 can cover a first frequency band FB1 from 2400 MHz to 2500 MHz, and a second frequency band FB2 from 5150 MHz to 5850 MHz. Therefore, the mobile device 200 can support at least the dual-band operations of WLAN (Wireless Local Area Networks) 2.4 GHz/5 GHz. According to practical measurements, the radiation efficiency of the H-shaped slot antenna 240 is about 40% or higher within the first frequency band FB1, and the radiation efficiency of the H-shaped slot antenna 240 is about 40% or higher within the second frequency band FB2. This can meet the requirements for application in general mobile communication devices.

According to antenna theory, the first slot 260 is considered as a main radiator of the H-shaped slot antenna 240, and the second slot 270 is considered as an auxiliary radiator of the H-shaped slot antenna 240. When the H-shaped slot antenna 240 is fed by the signal source 290, equivalent magnetic currents are induced and generated within all of the following: the connection slot 250, the first slot 260, and the second slot 270, such that a first resonant path PA1 and a second resonant path PA2 are formed in the H-shaped slot antenna 240. The length of the first resonant path PA1 is longer than the length of the second resonant path PA2. Specifically, the first resonant path PA1 begins from the first end 261 of the first slot 260, and extends through the connection slot 250 to the first end 271 of the second slot 270. The first resonant path PA1 is excited to generate the aforementioned first frequency band FB1. The second resonant path PA2 begins from the second end 262 of the first slot 260, and extends through the connection slot 250 to the second end 272 of the second slot 270. The second resonant path PA2 is excited to generate the aforementioned second frequency band FB2. According to practical measurements, such a design with dual slots and dual resonant paths can help to minimize the total length and the total size of the H-shaped slot antenna 240. In addition, the metal cavity structure 230 is used as an energy reflective plane relative to the H-shaped slot antenna 240, thereby enhancing the radiation gain of the H-shaped slot antenna 240.

The element sizes of the mobile device 200 may be as follows. The length L1 of the first slot 260 and the length L2 of the second slot 270 may be both shorter than 0.4 wavelength of the first frequency band FB1 (e.g., equal to 0.32 wavelength). The width of the coupling gap GC1 may be shorter than 0.5 mm (e.g., equal to 0.3 mm). The length of the first resonant path PA1 may be shorter than 0.5 wavelength of the first frequency band FB1 (e.g., equal to 0.46 wavelength). The length of the second resonant path PA2 may be shorter than 0.5 wavelength of the second frequency band FB2 (e.g., equal to 0.45 wavelength). The total length of the metal cavity structure 230 may be substantially equal to 0.32 wavelength of the first frequency band FB1. The total width of the metal cavity structure 230 may be substantially equal to 0.045 wavelength of the first frequency band FB1. The total height of the metal cavity structure 230 may be substantially equal to 0.045 wavelength of the first frequency band FB1.

Figure 3A:
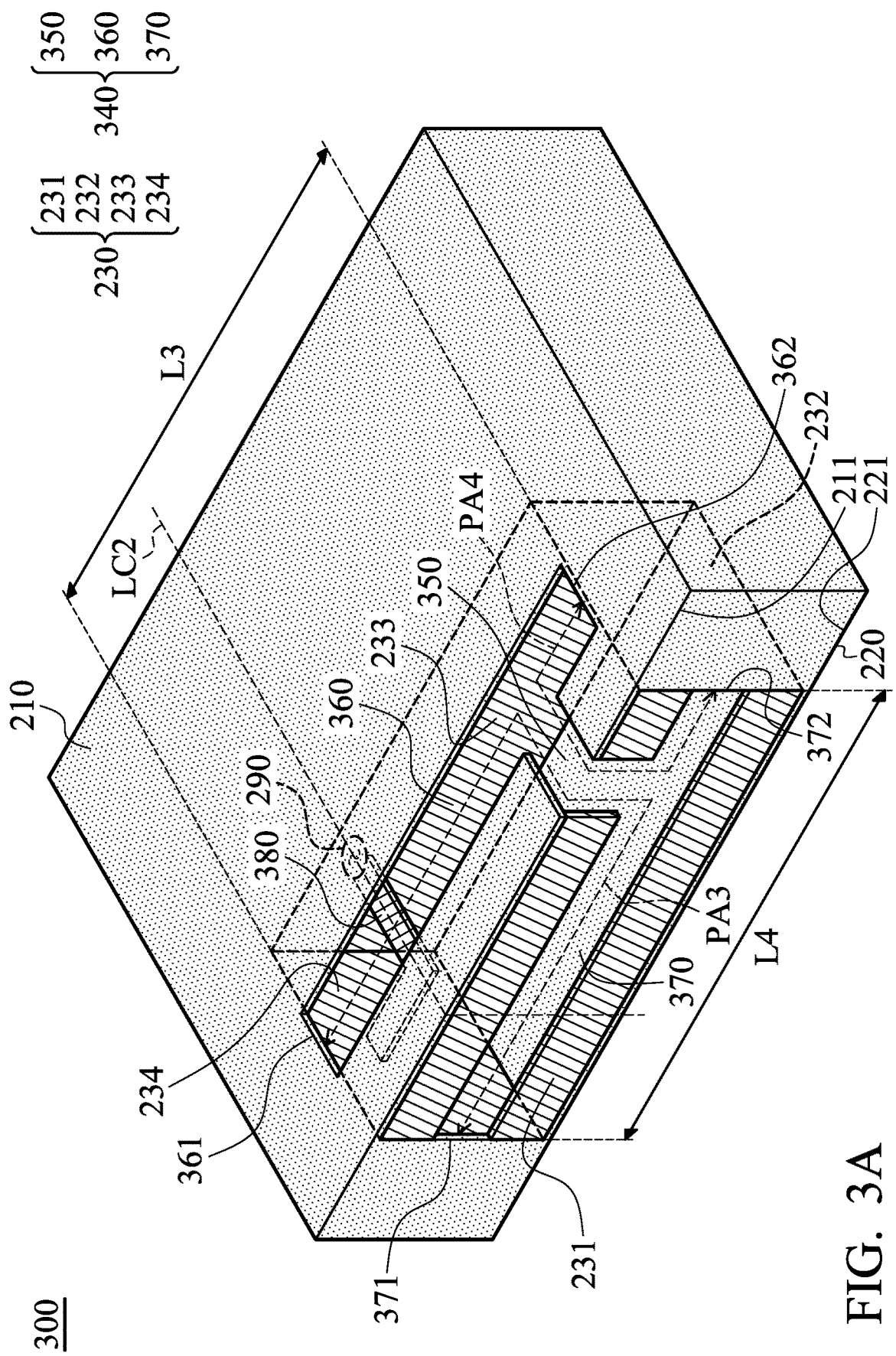
FIG. 3A is a partial perspective view of a mobile device according to another embodiment of the disclosure.
Figure 3B:
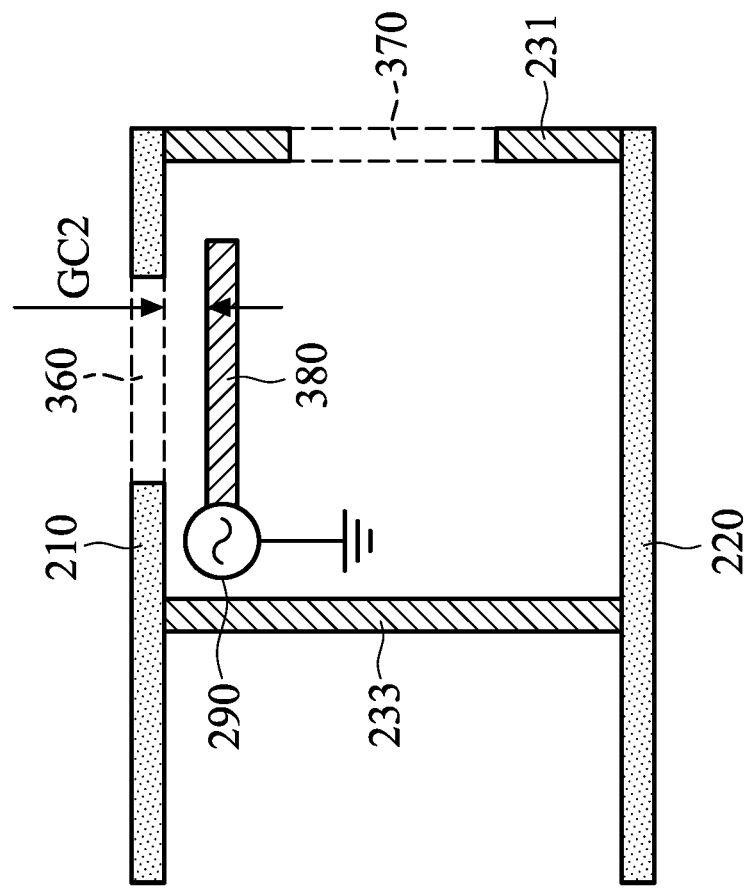
FIG. 3B is a sectional view of a mobile device according to another embodiment of the disclosure.

FIG. 3A is a partial perspective view of a mobile device 300 according to another embodiment of the disclosure. FIG. 3B is a sectional view of the mobile device 300 (along a sectional line LC2 of FIG. 3A) according to another embodiment of the disclosure. Please refer to FIG. 3A and FIG. 3B. FIG. 3A and FIG. 3B are similar to FIG. 2A and FIG. 2B. In the embodiment of FIG. 3A and FIG. 3B, an H-shaped slot antenna 340 of the mobile device 300 has a connection slot 350, a first slot 360, and a second slot 370. The first slot 360 is positioned at the host upper cover 210, and the second slot 370 is positioned at the first metal partition 231. That is, the first slot 360 and the second slot 370 may be positioned at two planes which are substantially perpendicular to each other, respectively. The connection slot 350 may extend from the host upper cover 210 to the first metal partition 231. A feeding element 380 of the mobile device 300 may extend across the first slot 360, but may not extend across the second slot 370. A coupling gap GC2 is formed between the feeding element 380 and the first slot 360, so as to excite the H-shaped slot antenna 340. In other words, the feeding element 380 has a vertical projection on the host upper cover 210, and the vertical projection at least partially overlaps the first slot 360 but does not overlap the second slot 370 at all.

Figure 3C:
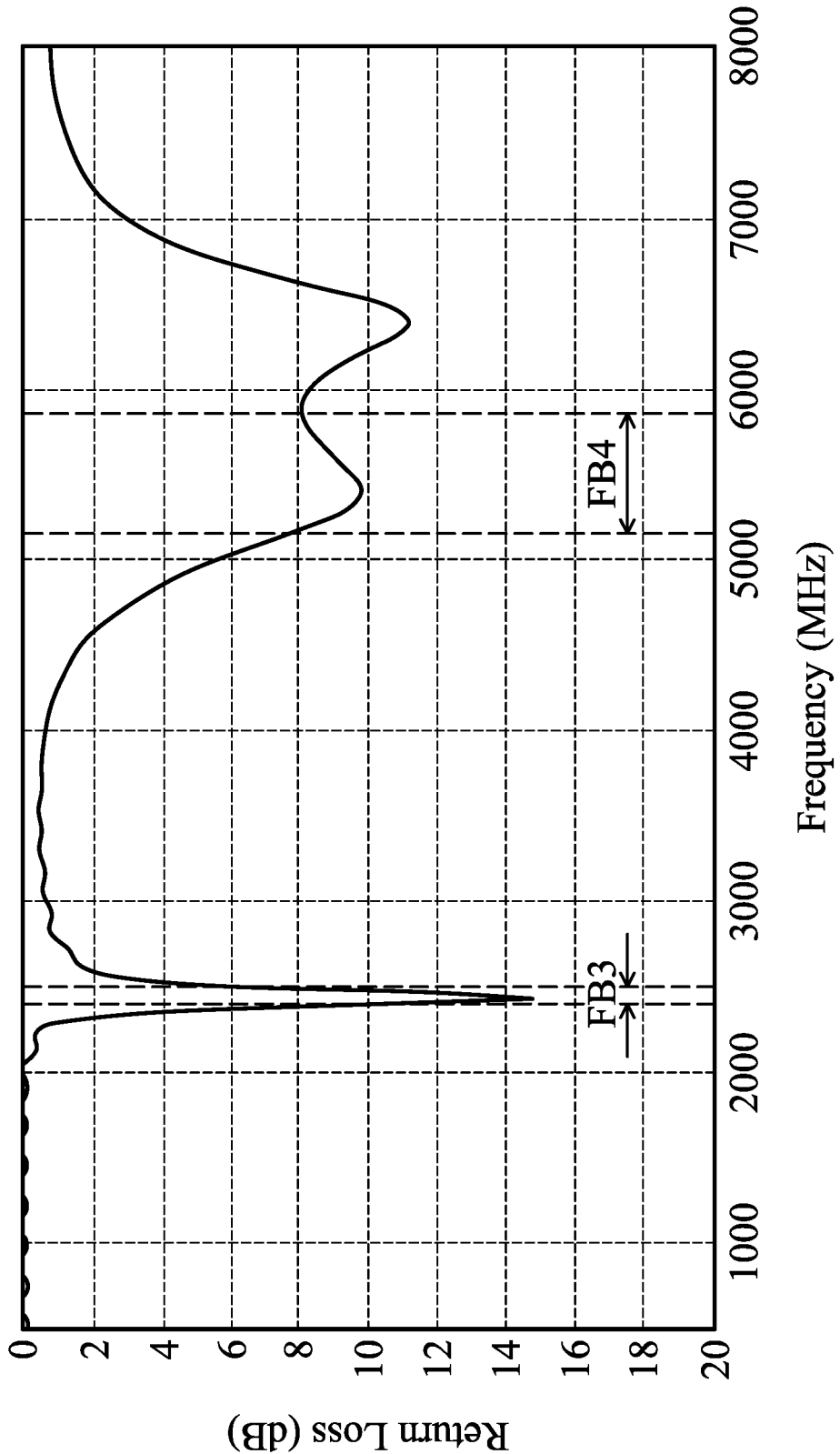
FIG. 3C is a diagram of return loss of an H-shaped slot antenna of a mobile device according to another embodiment of the disclosure.

FIG. 3C is a diagram of return loss of the H-shaped slot antenna 340 of the mobile device 300 according to another embodiment of the disclosure. According to the measurement of FIG. 3C, the H-shaped slot antenna 340 can cover a first frequency band FB3 from 2400 MHz to 2500 MHz, and a second frequency band FB4 from 5150 MHz to 5850 MHz. According to practical measurements, the radiation efficiency of the H-shaped slot antenna 340 is about 75% or higher within the first frequency band FB3, and the radiation efficiency of the H-shaped slot antenna 340 is about 80% or higher within the second frequency band FB4. According to antenna theory, the H-shaped slot antenna 340 has a first resonant path PA3 and a second resonant path PA4. The length of the first resonant path PA3 is longer than the length of the second resonant path PA4. Specifically, the first resonant path PA3 begins from a first end 361 of the first slot 360, and extends through the connection slot 350 to a first end 371 of the second slot 370. The first resonant path PA3 is excited to generate the aforementioned first frequency band FB3. The second resonant path PA4 begins from a second end 362 of the first slot 360, and extends through the connection slot 350 to a second end 372 of the second slot 370. The second resonant path PA4 is excited to generate the aforementioned second frequency band FB4. According to practical measurements, if the first slot 360 is positioned at the host upper cover 210 and the second slot 370 is positioned at the first metal partition 231, such a design can help to increase the radiation efficiency of the H-shaped slot antenna 340 and minimize the total size of the H-shaped slot antenna 340.

The element sizes of the mobile device 300 may be as follows. The length L3 of the first slot 360 and the length L4 of the second slot 370 may be both shorter than 0.3 wavelength of the first frequency band FB3 (e.g., equal to 0.26 wavelength). The width of the coupling gap GC2 may be shorter than 0.5 mm (e.g., equal to 0.3 mm). The length of the first resonant path PA3 may be shorter than 0.5 wavelength of the first frequency band FB3 (e.g., equal to 0.41 wavelength). The length of the second resonant path PA4 may be shorter than 0.4 wavelength of the second frequency band FB4 (e.g., equal to 0.36 wavelength). Other features of the mobile device 300 of FIG. 3A and FIG. 3B are similar to those of the mobile device 200 of FIG. 2A and FIG. 2B. Therefore, the two embodiments can achieve similar levels of performance.

Figure 4A:
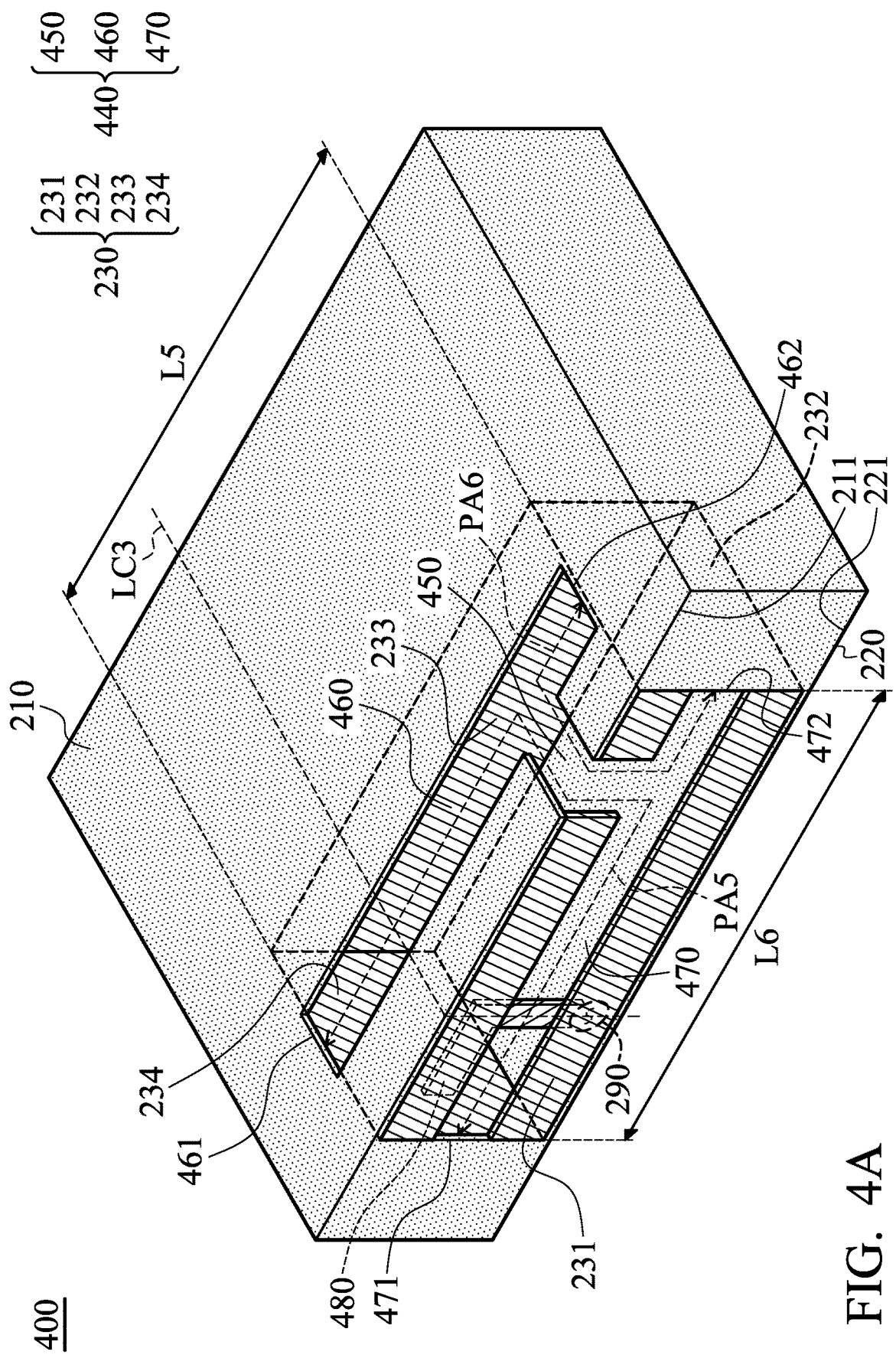
FIG. 4A is a partial perspective view of a mobile device according to another embodiment of the disclosure.
Figure 4B:
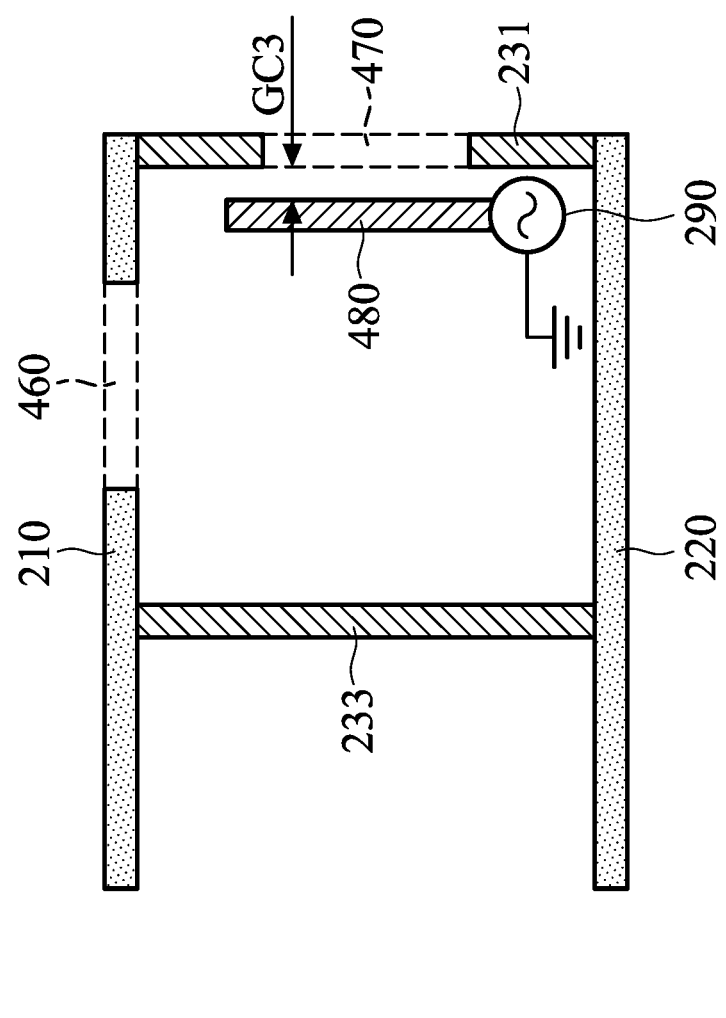
FIG. 4B is a sectional view of a mobile device according to another embodiment of the disclosure.

FIG. 4A is a partial perspective view of a mobile device 400 according to another embodiment of the disclosure. FIG. 4B is a sectional view of the mobile device 400 (along a sectional line LC3 of FIG. 4A) according to another embodiment of the disclosure. Please refer to FIG. 4A and FIG. 4B. FIG. 4A and FIG. 4B are similar to FIG. 2A and FIG. 2B. In the embodiment of FIG. 4A and FIG. 4B, an H-shaped slot antenna 440 of the mobile device 400 has a connection slot 450, a first slot 460, and a second slot 470. The first slot 460 is positioned at the host upper cover 210, and the second slot 470 is positioned at the first metal partition 231. The connection slot 450 may extend from the host upper cover 210 to the first metal partition 231. A feeding element 480 of the mobile device 400 may extend across the second slot 470, but may not extend across the first slot 460. A coupling gap GC3 is formed between the feeding element 480 and the second slot 470, so as to excite the H-shaped slot antenna 440. In other words, the feeding element 480 has a vertical projection on the first metal partition 231, and the vertical projection at least partially overlaps the second slot 470 but does not overlap the first slot 460 at all.

Figure 4C:
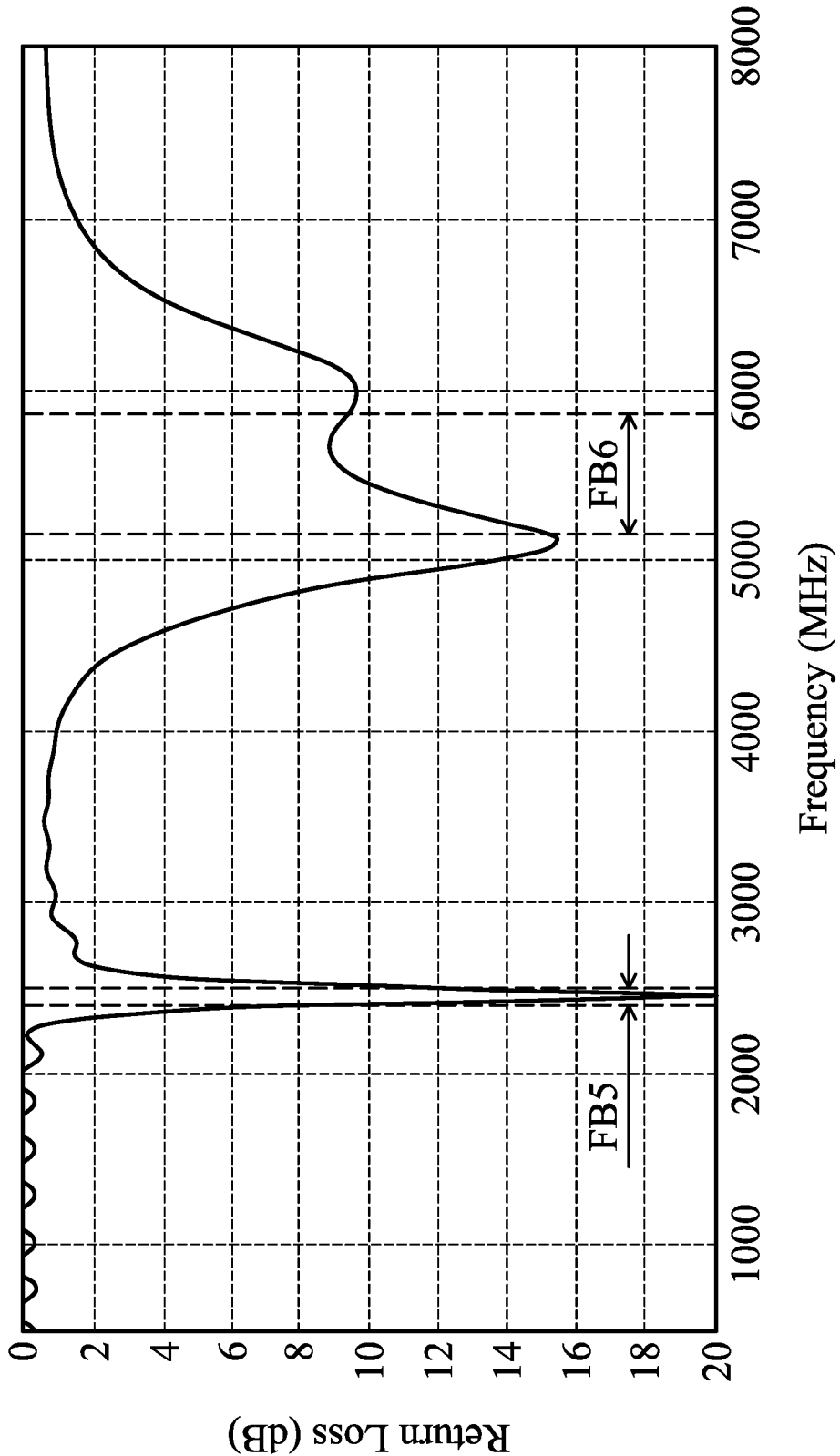
FIG. 4C is a diagram of return loss of an H-shaped slot antenna of a mobile device according to another embodiment of the disclosure.

FIG. 4C is a diagram of return loss of the H-shaped slot antenna 440 of the mobile device 400 according to another embodiment of the disclosure. According to the measurement of FIG. 4C, the H-shaped slot antenna 440 can cover a first frequency band FB5 from 2400 MHz to 2500 MHz, and a second frequency band FB6 from 5150 MHz to 5850 MHz. According to practical measurements, the radiation efficiency of the H-shaped slot antenna 440 is about 65% or higher within the first frequency band FB5, and the radiation efficiency of the H-shaped slot antenna 440 is about 85% or higher within the second frequency band FB6. According to antenna theory, the H-shaped slot antenna 440 has a first resonant path PA5 and a second resonant path PA6. The length of the first resonant path PA5 is longer than the length of the second resonant path PA6. Specifically, the first resonant path PA5 begins from a first end 461 of the first slot 460, and extends through the connection slot 450 to a first end 471 of the second slot 470. The first resonant path PA5 is excited to generate the aforementioned first frequency band FB5. The second resonant path PA6 begins from the second end 462 of the first slot 460, and extends through the connection slot 450 to the second end 472 of the second slot 470. The second resonant path PA6 is excited to generate the aforementioned second frequency band FB6. According to practical measurements, if the first slot 460 is positioned at the host upper cover 210 and the second slot 470 is positioned at the first metal partition 231, such a design can help to increase the radiation efficiency of the H-shaped slot antenna 440 and minimize the total size of the H-shaped slot antenna 440.

The element sizes of the mobile device 400 may be as follows. The length L5 of the first slot 460 and the length L6 of the second slot 470 may be both shorter than or equal to 0.3 wavelength of the first frequency band FB5. The width of the coupling gap GC3 may be shorter than 0.5 mm (e.g., equal to 0.3 mm). The length of the first resonant path PA5 may be shorter than or equal to 0.4 wavelength of the first frequency band FB5. The length of the second resonant path PA6 may be shorter than 0.5 wavelength of the second frequency band FB6 (e.g., equal to 0.4 wavelength). Other features of the mobile device 400 of FIG. 4A and FIG. 4B are similar to those of the mobile device 200 of FIG. 2A and FIG. 2B. Therefore, the two embodiments can achieve similar levels of performance.

Figure 5A:
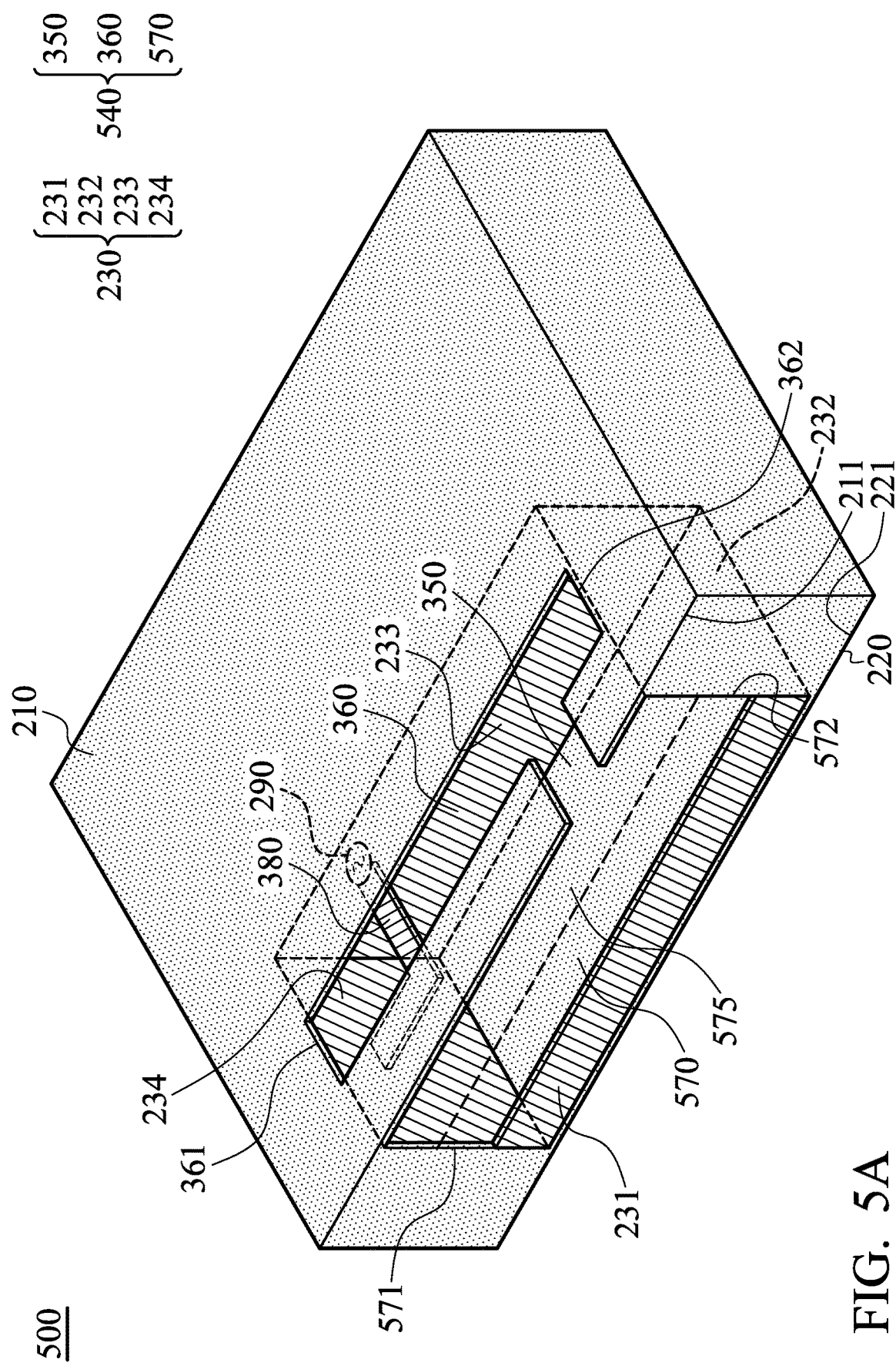
FIG. 5A is a partial perspective view of a mobile device according to another embodiment of the disclosure.

FIG. 5A is a partial perspective view of a mobile device 500 according to another embodiment of the disclosure. FIG. 5A is similar to FIG. 3A. In the embodiment of FIG. 5A, a second slot 570 of an H-shaped slot antenna 540 of the mobile device 500 further includes a widening portion 575. The widening portion 575 of the second slot 570 may substantially have a straight-line shape. The widening portion 575 of the second slot 570 is adjacent to the edge 211 of the host upper cover 210, or it directly touches the edge 211 of the host upper cover 210. According to practical measurements, such a design with a widened slot can help to increase the operation bandwidth of the H-shaped slot antenna 540 and enhance the radiation efficiency of the H-shaped slot antenna 540. Other features of the mobile device 500 of FIG. 5A are similar to those of the mobile device 300 of FIG. 3A and FIG. 3B. Therefore, the two embodiments can achieve similar levels of performance.

Figure 5B:
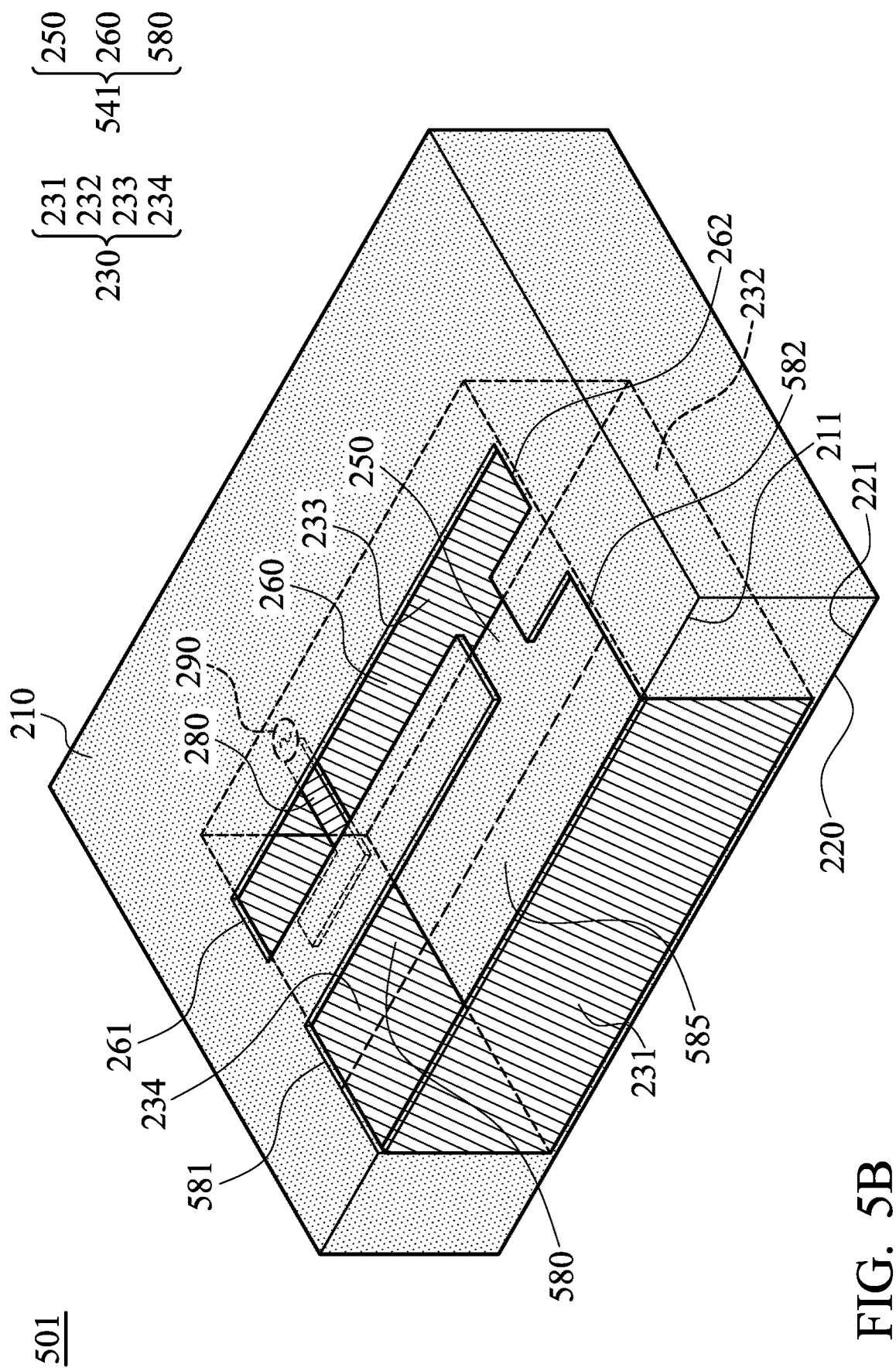
FIG. 5B is a partial perspective view of a mobile device according to another embodiment of the disclosure.

FIG. 5B is a partial perspective view of a mobile device 501 according to another embodiment of the disclosure. FIG. 5B is similar to FIG. 2A. In the embodiment of FIG. 5B, a second slot 580 of an H-shaped slot antenna 541 of the mobile device 501 further includes a widening portion 585. The widening portion 585 of the second slot 580 may substantially have a straight-line shape. The widening portion 585 of the second slot 580 is adjacent to the edge 211 of the host upper cover 210, or it directly touches the edge 211 of the host upper cover 210. According to practical measurements, such a design with a widened slot can help to increase the operation bandwidth of the H-shaped slot antenna 541 and enhance the radiation efficiency of the H-shaped slot antenna 541. Other features of the mobile device 501 of FIG. 5B are similar to those of the mobile device 200 of FIG. 2A and FIG. 2B. Therefore, the two embodiments can achieve similar levels of performance.

Figure 5C:
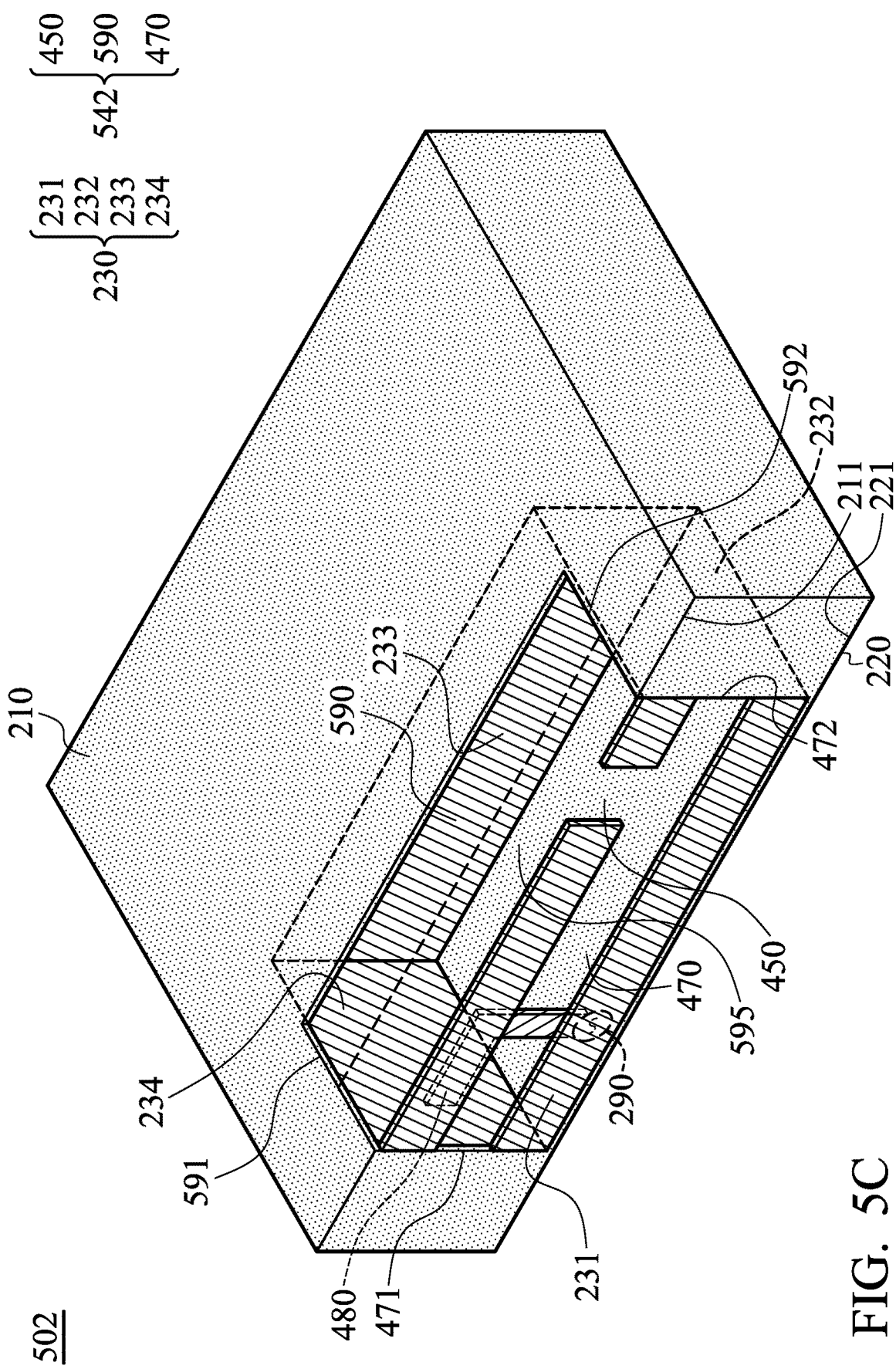
FIG. 5C is a partial perspective view of a mobile device according to another embodiment of the disclosure.

FIG. 5C is a partial perspective view of a mobile device 502 according to another embodiment of the disclosure. FIG. 5C is similar to FIG. 4A. In the embodiment of FIG. 5C, a first slot 590 of an H-shaped slot antenna 542 of the mobile device 502 further includes a widening portion 595. The widening portion 595 of the first slot 590 may substantially have a straight-line shape. The widening portion 595 of the first slot 590 is adjacent to the edge 211 of the host upper cover 210, or it directly touches the edge 211 of the host upper cover 210. In alternative embodiments, the first slot 590 is further widened to be adjacent to or directly touch the edge of the third metal partition 233 (not shown). According to practical measurements, such a design with a widened slot can help to increase the operation bandwidth of the H-shaped slot antenna 542 and enhance the radiation efficiency of the H-shaped slot antenna 542. Other features of the mobile device 502 of FIG. 5C are similar to those of the mobile device 400 of FIG. 4A and FIG. 4B. Therefore, the two embodiments can achieve similar levels of performance.

Figure 6:
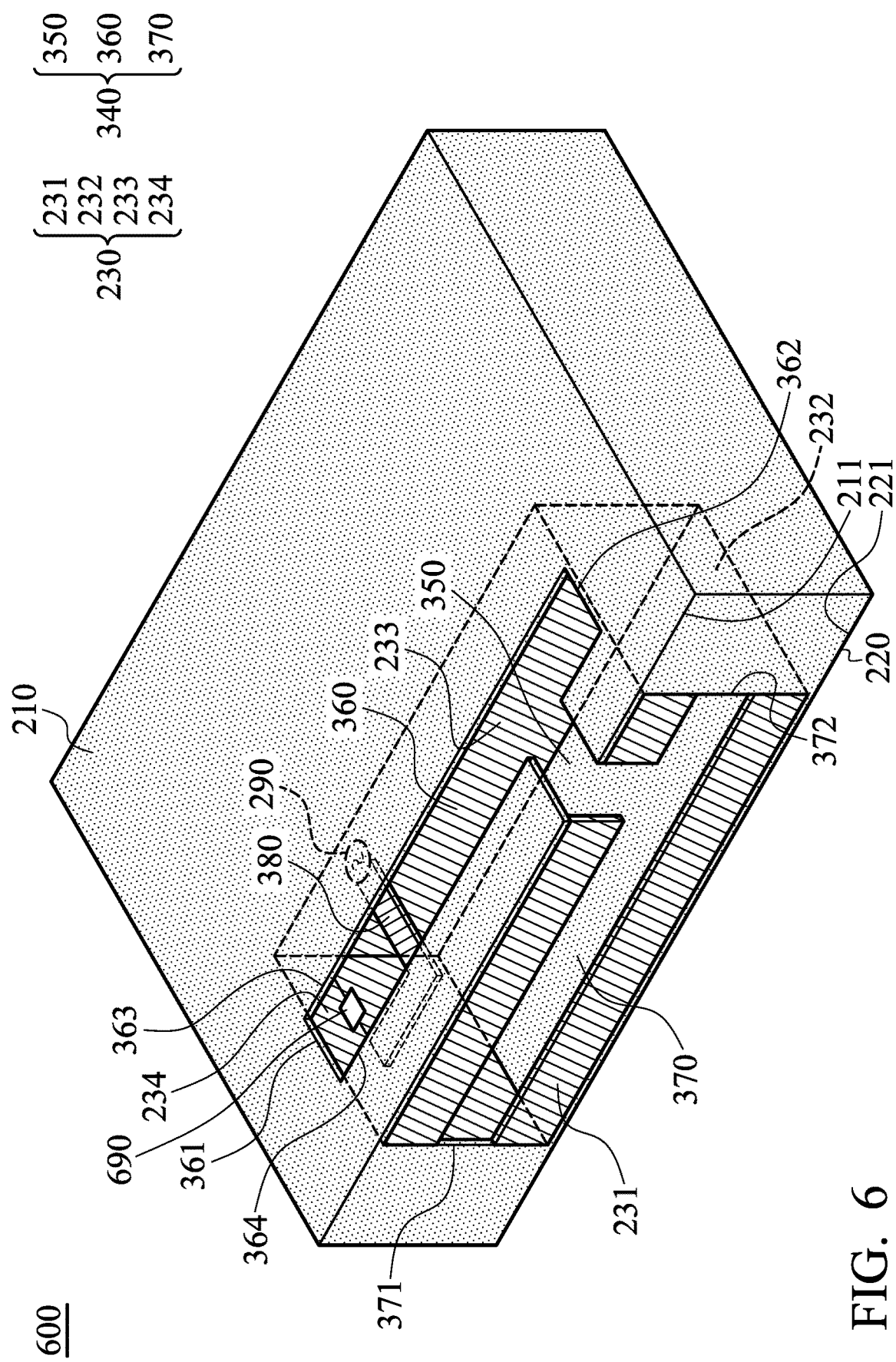
FIG. 6 is a partial perspective view of a mobile device according to another embodiment of the disclosure.

FIG. 6 is a partial perspective view of a mobile device 600 according to another embodiment of the disclosure. FIG. 6 is similar to FIG. 3A. In the embodiment of FIG. 6, the mobile device 600 further includes a circuit element 690, and the circuit element 690 is coupled between two opposite sides 363 and 364 of the first slot 360, so as to fine-tune the impedance matching of the H-shaped slot antenna 340. For example, the circuit element 690 may be a fixed capacitor, a variable capacitor, a fixed inductor, or a variable inductor, but it is not limited thereto. Specifically, the circuit element 690 is substantially positioned between the feeding element 380 and the first end 361 of the first slot 360. According to practical measurements, such a design incorporating the circuit element 690 can help to increase the operation bandwidth of the H-shaped slot antenna 340 and enhance the radiation efficiency of the H-shaped slot antenna 340. Other features of the mobile device 600 of FIG. 6 are similar to those of the mobile device 300 of FIG. 3A and FIG. 3B. Therefore, the two embodiments can achieve similar levels of performance.

Figure 7A:
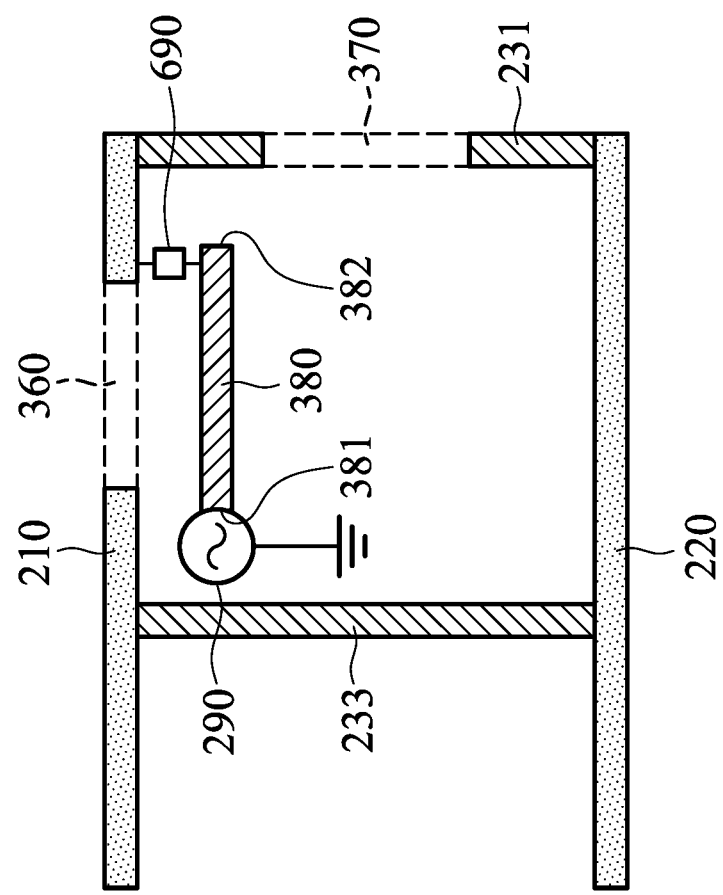
FIG. 7A is a sectional view of a mobile device according to another embodiment of the disclosure.

FIG. 7A is a sectional view of a mobile device 700 according to another embodiment of the disclosure. FIG. 7A is similar to FIG. 3B. In the embodiment of FIG. 7A, the mobile device 700 further includes a circuit element 690, and the feeding element 380 is coupled through the circuit element 690 to the host upper cover 210 or the first metal partition 231. Specifically, the feeding element 380 has a first end 381 and a second end 382. The first end 381 of the feeding element 380 is coupled to the signal source 290. The second end 382 of the feeding element 380 is coupled to the circuit element 690. According to practical measurements, such a design incorporating the circuit element 690 can help to increase the operation bandwidth of the H-shaped slot antenna 340 and enhance the radiation efficiency of the H-shaped slot antenna 340. Other features of the mobile device 700 of FIG. 7A are similar to those of the mobile device 300 of FIG. 3A and FIG. 3B. Therefore, the two embodiments can achieve similar levels of performance.

Figure 7B:
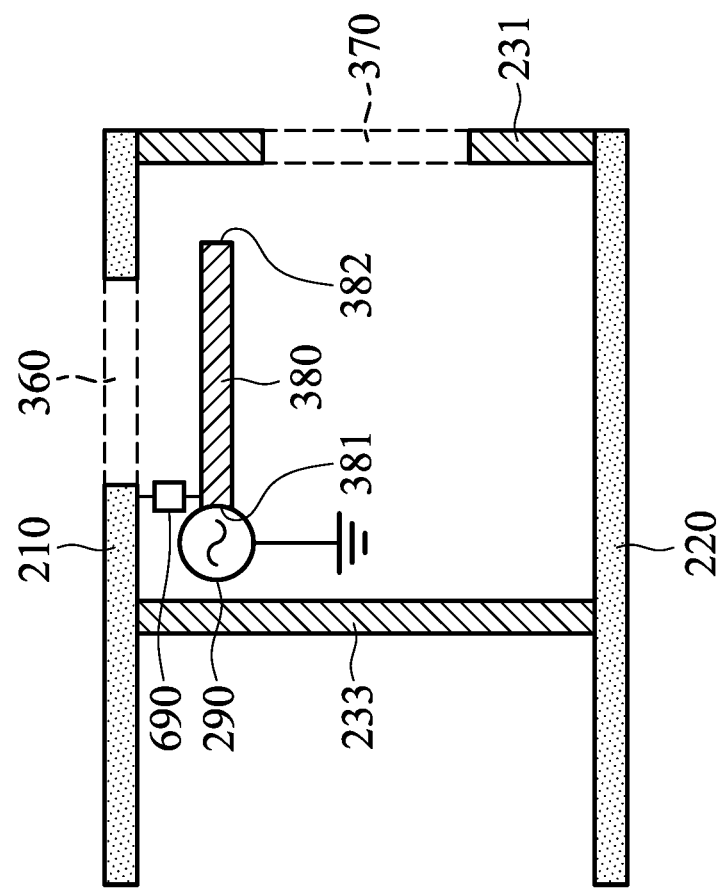
FIG. 7B is a sectional view of a mobile device according to another embodiment of the disclosure.

FIG. 7B is a sectional view of a mobile device 750 according to another embodiment of the disclosure. FIG. 7B is similar to FIG. 3B. In the embodiment of FIG. 7B, the mobile device 750 further includes a circuit element 690, and the feeding element 380 is coupled through the circuit element 690 to the host upper cover 210 or the first metal partition 231. Specifically, the feeding element 380 has a first end 381 and a second end 382. The first end 381 of the feeding element 380 is coupled to the signal source 290 and the circuit element 690. The second end 382 of the feeding element 380 is an open end. According to practical measurements, such a design incorporating the circuit element 690 can help to increase the operation bandwidth of the H-shaped slot antenna 340 and enhance the radiation efficiency of the H-shaped slot antenna 340. Other features of the mobile device 750 of FIG. 7B are similar to those of the mobile device 300 of FIG. 3A and FIG. 3B. Therefore, the two embodiments can achieve similar levels of performance.

Figure 8A:
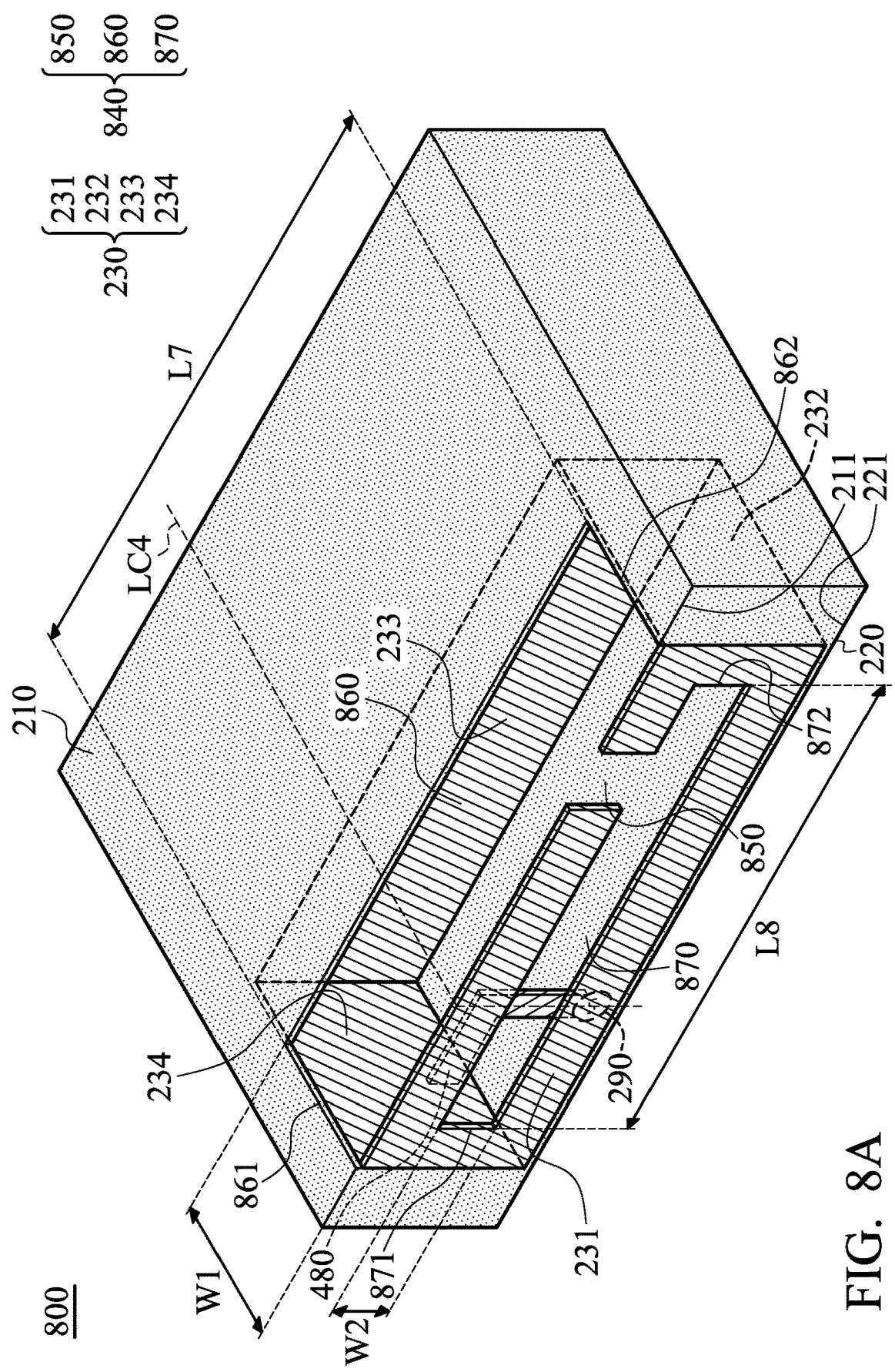
FIG. 8A is a partial perspective view of a mobile device according to another embodiment of the disclosure.
Figure 8B:
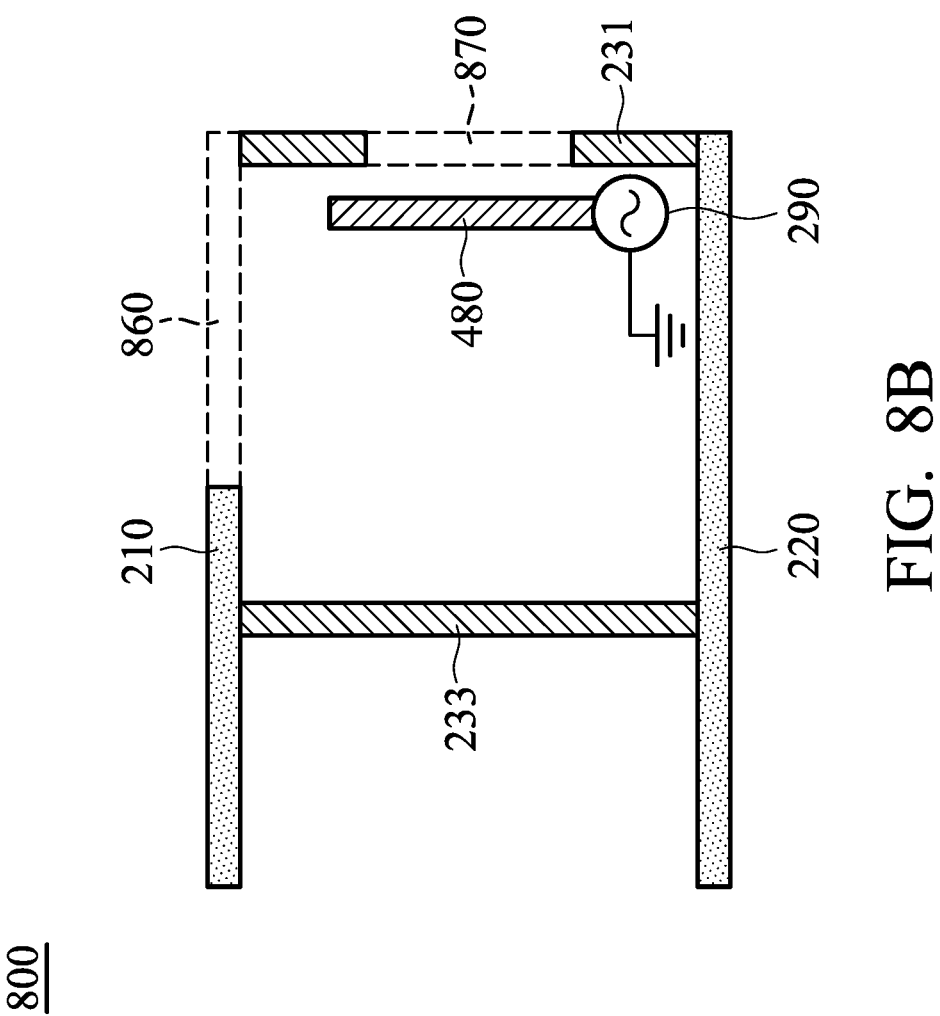
FIG. 8B is a sectional view of a mobile device according to another embodiment of the disclosure.

FIG. 8A is a partial perspective view of a mobile device 800 according to another embodiment of the disclosure. FIG. 8B is a sectional view of the mobile device 800 (along a sectional line LC4 of FIG. 8A) according to another embodiment of the disclosure. Please refer to FIG. 8A and FIG. 8B. FIG. 8A and FIG. 8B are similar to FIG. 4A and FIG. 4B. In the embodiment of FIG. 8A and FIG. 8B, an H-shaped slot antenna 840 of the mobile device 800 has a connection slot 850, a first slot 860, and a second slot 870. The first slot 860 is positioned at the host upper cover 210, and the second slot 870 and the connection slot 850 are positioned at the first metal partition 231. The first slot 860 of the H-shaped slot antenna 840 is adjacent to the edge 211 of the host upper cover 210, or it directly touches the edge 211 of the host upper cover 210. The length L7 of the first slot 860 is longer than the length L8 of the second slot 870. The length W1 of the first slot 860 is wider than the width W2 of the second slot 870.

Figure 8C:
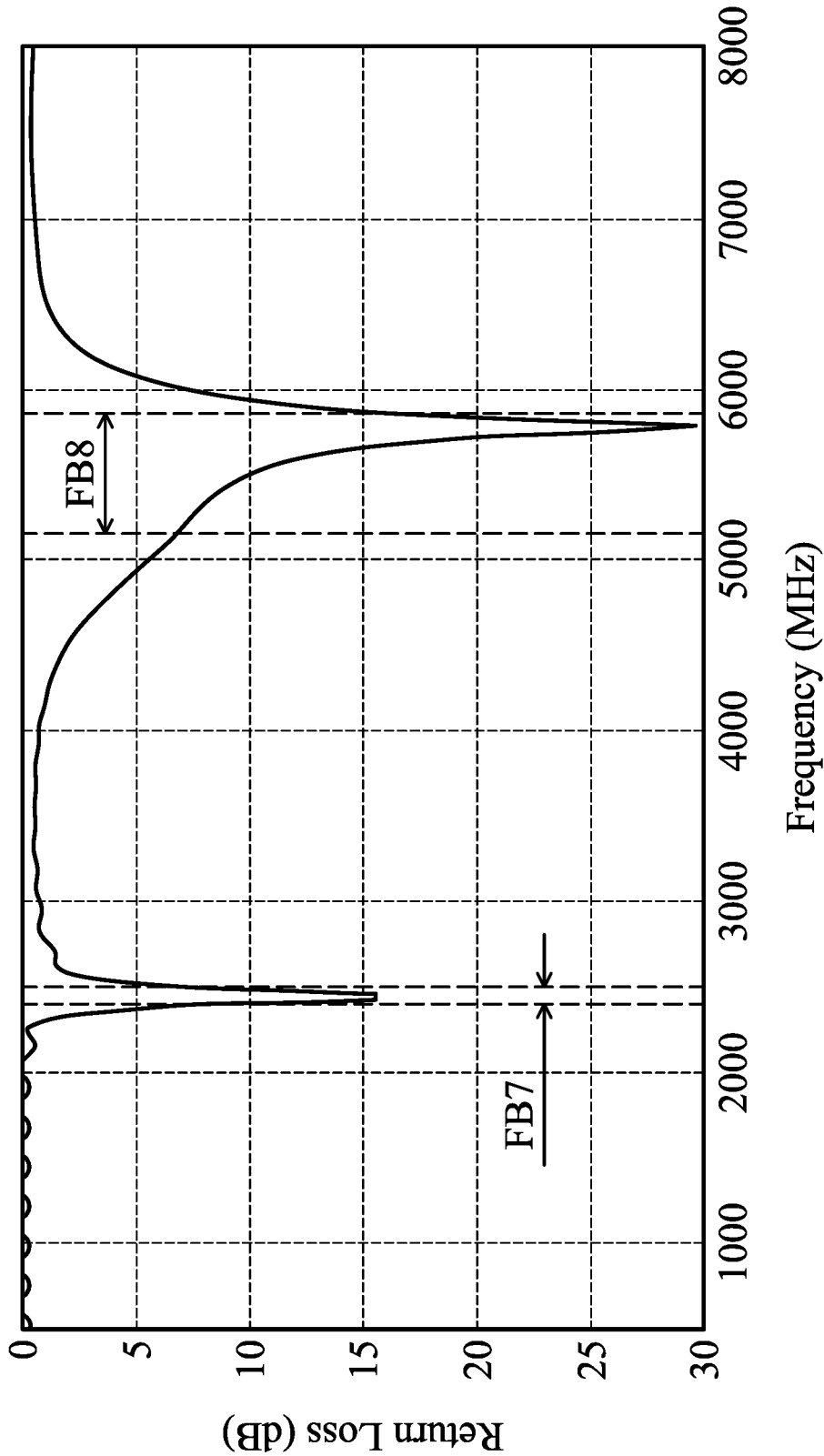
FIG. 8C is a diagram of return loss of an H-shaped slot antenna of a mobile device according to another embodiment of the disclosure.

FIG. 8C is a diagram of return loss of the H-shaped slot antenna 840 of the mobile device 800 according to another embodiment of the disclosure. According to the measurement of FIG. 8C, the H-shaped slot antenna 840 can cover a first frequency band FB7 from 2400 MHz to 2500 MHz, and a second frequency band FB8 from 5150 MHz to 5850 MHz. According to practical measurements, the radiation efficiency of the H-shaped slot antenna 840 is about 72% or higher within the first frequency band FB7, and the radiation efficiency of the H-shaped slot antenna 840 is about 77% or higher within the second frequency band FB8. The length L7 of the first slot 860 may be shorter than or equal to 0.2 wavelength of the first frequency band FB7. The length L8 of the second slot 870 may be shorter than or equal to 0.17 wavelength of the second frequency band FB8. Other features of the mobile device 800 of FIGS. 8A and 8B are similar to those of the mobile device 400 of FIG. 4A and FIG. 4B. Therefore, the two embodiments can achieve similar levels of performance.

Figure 9A:
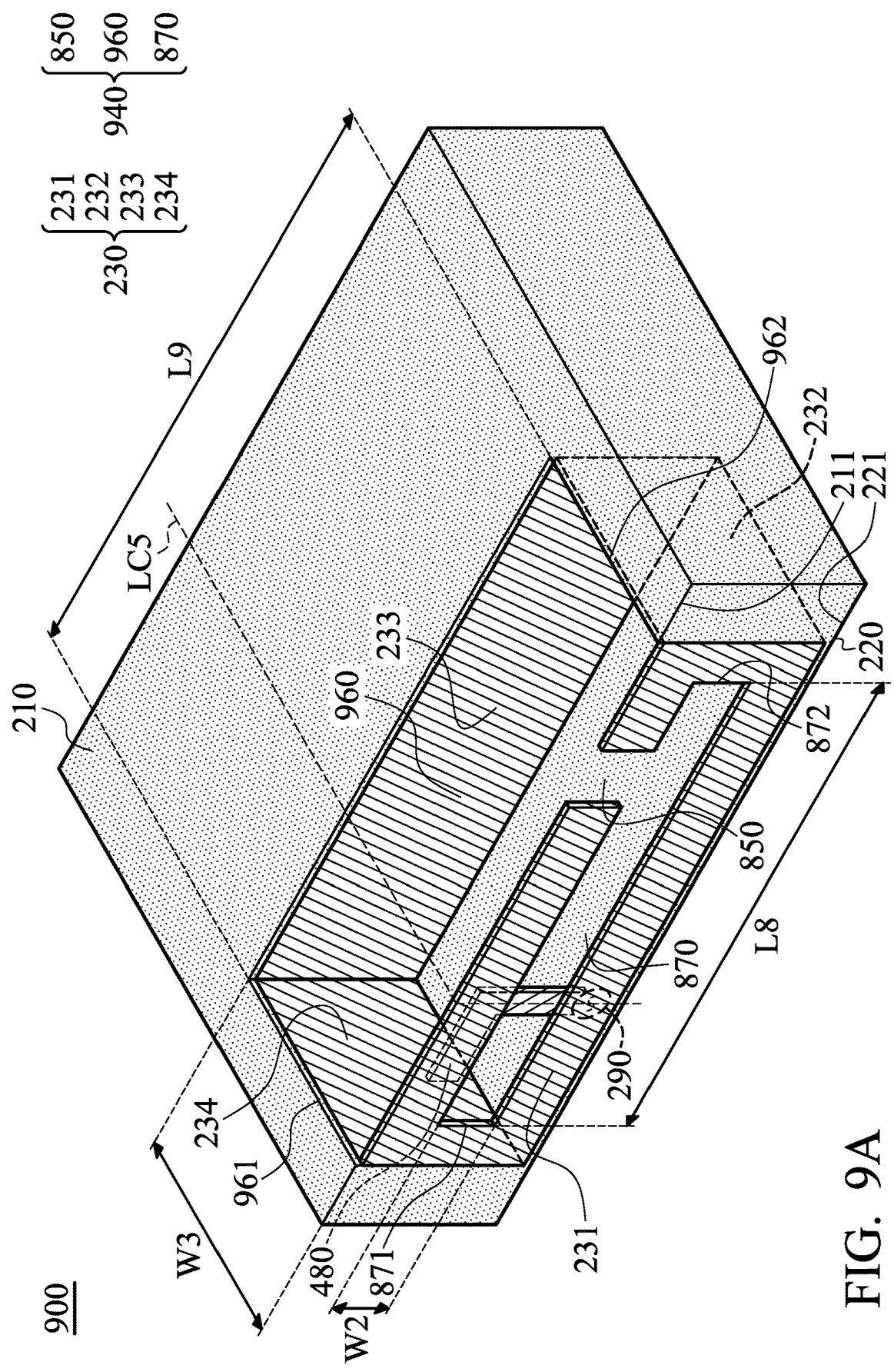
FIG. 9A is a partial perspective view of a mobile device according to another embodiment of the disclosure.
Figure 9B:
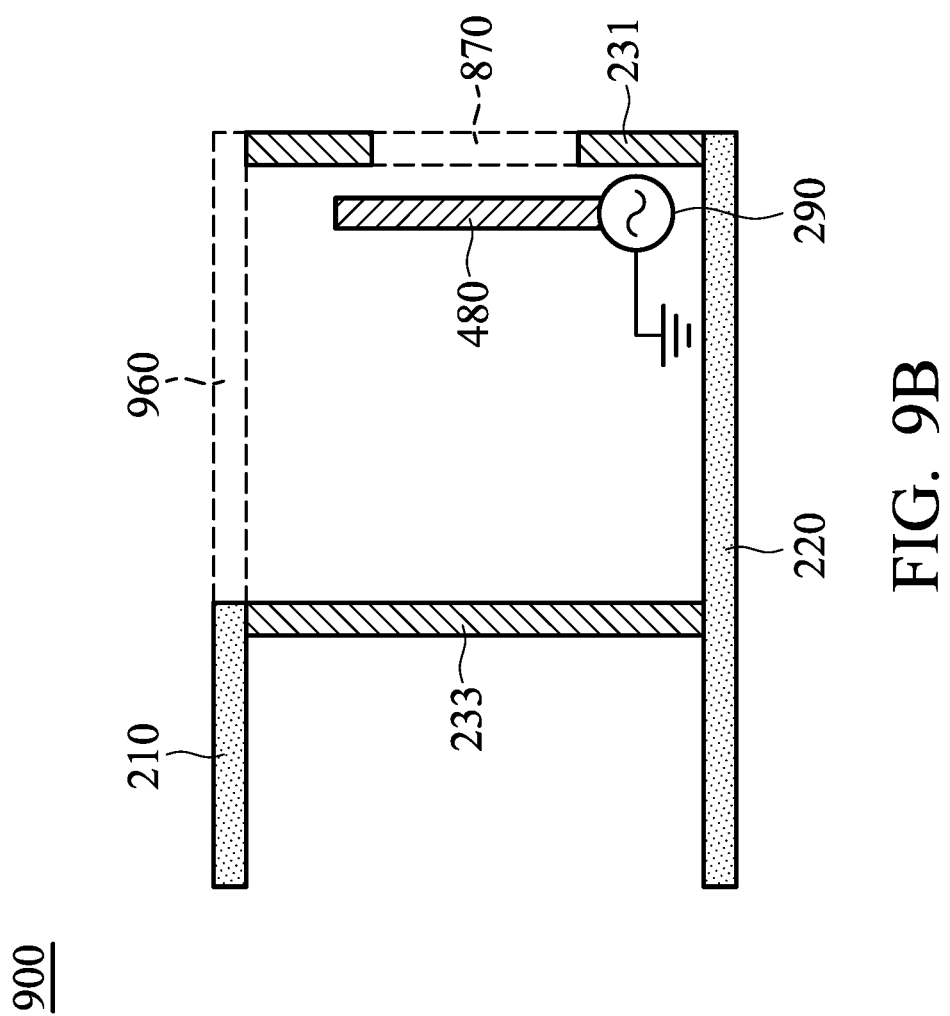
FIG. 9B is a sectional view of a mobile device according to another embodiment of the disclosure.

FIG. 9A is a partial perspective view of a mobile device 900 according to another embodiment of the disclosure. FIG. 9B is a sectional view of the mobile device 900 (along a sectional line LC5 of FIG. 9A) according to another embodiment of the disclosure. Please refer to FIG. 9A and FIG. 9B. FIG. 9A and FIG. 9B are similar to FIG. 4A and FIG. 4B. In the embodiment of FIG. 9A and FIG. 9B, an H-shaped slot antenna 940 of the mobile device 900 has a connection slot 850, a first slot 960, and a second slot 870. The first slot 960 is positioned at the host upper cover 210, and the second slot 870 and the connection slot 850 are positioned at the first metal partition 231. The first slot 960 of the H-shaped slot antenna 940 is adjacent to the edge 211 of the host upper cover 210, or it directly touches the edge 211 of the host upper cover 210. In addition, the first slot 960 of the H-shaped slot antenna 940 is adjacent to the edge of the third metal partition 233, or it directly touches the edge of the third metal partition 233. The length L9 of the first slot 960 is longer than the length L8 of the second slot 870. The length W3 of the first slot 960 is wider than the width W2 of the second slot 870. It should be noted that the width W3 of the first slot 960 of FIG. 9A and FIG. 9B is wider than the width W1 of the first slot 860 of FIG. 8A and FIG. 8B.

Figure 9C:
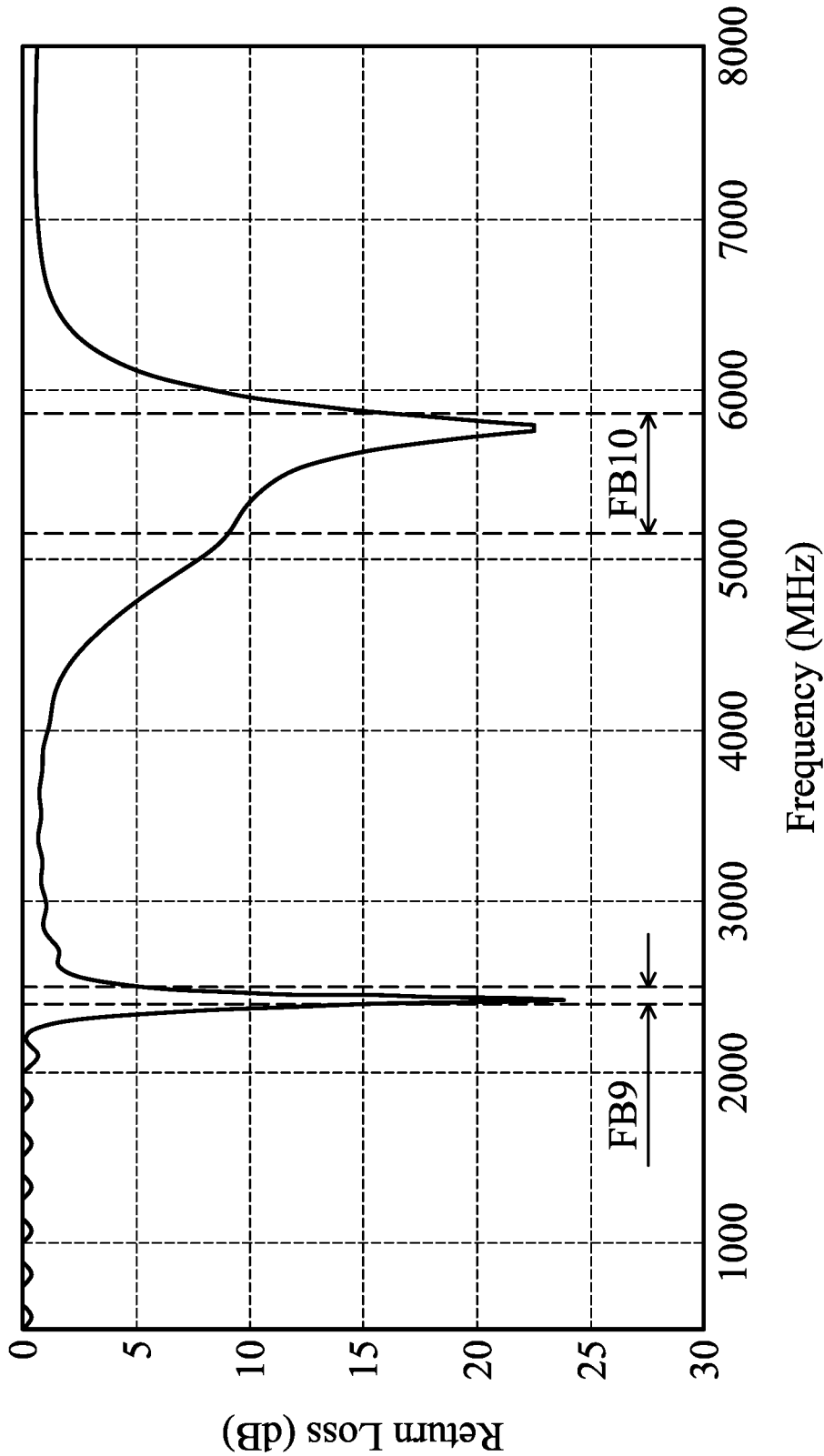
FIG. 9C is a diagram of return loss of an H-shaped slot antenna of a mobile device according to another embodiment of the disclosure.

FIG. 9C is a diagram of return loss of the H-shaped slot antenna 940 of the mobile device 900 according to another embodiment of the disclosure. According to the measurement of FIG. 9C, the H-shaped slot antenna 940 can cover a first frequency band FB9 from 2400 MHz to 2500 MHz, and a second frequency band FB10 from 5150 MHz to 5850 MHz. According to practical measurements, the radiation efficiency of the H-shaped slot antenna 940 is about 71% or higher within the first frequency band FB9, and the radiation efficiency of the H-shaped slot antenna 940 is about 86% or higher within the second frequency band FB10. The length L9 of the first slot 960 may be shorter than or equal to 0.2 wavelength of the first frequency band FB9. The length L8 of the second slot 870 may be shorter than or equal to 0.17 wavelength of the second frequency band FB10. Other features of the mobile device 900 of FIGS. 9A and 9B are similar to those of the mobile device 400 of FIG. 4A and FIG. 4B. Therefore, the two embodiments can achieve similar levels of performance.

The disclosure proposes a novel mobile device including an H-shaped slot antenna. Since the H-shaped slot antenna is adjacent to a host device of the mobile device, it does not occupy the space around the display frame and can meet the current design trend of narrow-border mobile devices. When the H-shaped slot antenna is integrated with a host upper cover made of a metal material, the communication quality of the mobile device is not negatively affected because the host upper cover is considered an extension portion of the H-shaped slot antenna. It should be also noted that the designed appearance of the mobile device is improved because the H-shaped slot antenna of the disclosure does not open any antenna window on the back cover of the mobile device. In conclusion, the disclosure has at least the advantages of small size, wide band, and a beautiful appearance, and it is suitable for application in a variety of mobile communication devices.

Note that the above element sizes, element shapes, and frequency ranges are not limitations of the disclosure. An antenna designer can fine-tune these settings or values according to different requirements. It should be understood that the mobile device and the antenna structure of the disclosure are not limited to the configurations of FIGS. 1-9. The disclosure may include any one or more features of any one or more embodiments of FIGS. 1-9. In other words, not all of the features displayed in the figures should be implemented in the mobile device and the antenna structure of the disclosure. For example, in some embodiments, the H-shaped slot antenna is adjusted in response to design requirements, and the length of the first slot is designed to be different from the length of the second slot.

For example, in some embodiments, an H-shaped slot antenna of the mobile device has a connection slot, a first slot, and a second slot. A feeding element of the mobile device extends across the first slot, but does not extend across the second slot. In these embodiments, the first slot is positioned at a first metal partition of the mobile device, and the second slot is positioned at a host lower cover of the mobile device. That is, the first slot and the second slot may be positioned at two planes which are substantially perpendicular to each other, respectively.

For example, in some embodiments, an H-shaped slot antenna of the mobile device has a connection slot, a first slot, and a second slot. A feeding element of the mobile device extends across the first slot, but does not extend across the second slot. In these embodiments, the first slot is positioned at a first metal partition of the mobile device, and the second slot is positioned at a junction between the first metal partition and the host lower cover. Specifically, the second slot extends from the junction between the first metal partition and the host lower cover.

For example, in some embodiments, an H-shaped slot antenna of the mobile device has a connection slot, a first slot, and a second slot. A feeding element of the mobile device extends across the first slot, but does not extend across the second slot. In these embodiments, the first slot, the connection slot, and the second slot are all positioned at a host lower cover of the mobile device. Specifically, the first slot and the second slot may be substantially parallel to each other.

For example, in some embodiments, this novel mobile device including the H-shaped slot antenna structure can be a laptop, a wireless access point device, a mobile phone, etc. In some embodiments, the mobile device includes multiple H-shaped slot antenna structures for Multi-input Multi-output (MIMO) configurations or omnidirectional radiation patterns.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the disclosure. It is intended that the standard and examples be considered as exemplary only, with the true scope of the disclosed embodiments being indicated by the following claims and their equivalents.

What is claimed is:

1. A mobile device, comprising:
a host upper cover;
a host lower cover;
a metal cavity structure, coupled between the host upper cover and the host lower cover;
an H-shaped slot antenna, formed on the host upper cover, the host lower cover, the metal cavity structure, the host upper cover and the metal cavity structure, or the host lower cover and the metal cavity structure; and
a feeding element, coupled to a signal source, wherein the feeding element is configured to excite the H-shaped slot antenna;
wherein the H-shaped slot antenna has a connection slot, a first slot, and a second slot, and wherein the connection slot is connected between the first slot and the second slot;
wherein the H-shaped slot antenna covers a first frequency band and a second frequency band;
wherein the first frequency band is from 2400 MHz to 2500 MHz, and the second frequency band is from 5150 MHz to 5850 MHz;
wherein a length of each of the first slot and the second slot is shorter than 0.4 wavelength of the first frequency band.

2. The mobile device as claimed in claim 1, wherein the host upper cover and the host lower cover are made of metal materials.

3. The mobile device as claimed in claim 1, wherein the metal cavity structure is adjacent to an edge of the host upper cover and an edge of the host lower cover.

4. The mobile device as claimed in claim 3, wherein the metal cavity structure comprises a first metal partition, a second metal partition, a third metal partition, and a fourth metal partition, and wherein the first metal partition is aligned with the edge of the host upper cover and the edge of the host lower cover.

5. The mobile device as claimed in claim 4, wherein each of the first slot and the second slot substantially has a straight-line shape.

6. The mobile device as claimed in claim 4, wherein a length of the second slot is substantially equal to a length of the first slot.

7. The mobile device as claimed in claim 4, wherein the first slot and the second slot are positioned at the host upper cover.

8. The mobile device as claimed in claim 7, wherein the feeding element extends across the first slot.

9. The mobile device as claimed in claim 4, wherein the first slot is positioned at the host upper cover, and the second slot is positioned at the first metal partition.

10. The mobile device as claimed in claim 9, wherein the feeding element extends across the first slot or the second slot.

11. The mobile device as claimed in claim 9, wherein the second slot further comprises a widening portion, and the widening portion is adjacent to the edge of the host upper cover.

12. The mobile device as claimed in claim 9, further comprising:

a circuit element, configured to fine-tune impedance matching of the H-shaped slot antenna.

13. The mobile device as claimed in claim 12, wherein the circuit element is a capacitor or an inductor.

14. The mobile device as claimed in claim 12, wherein the circuit element is coupled between two opposite sides of the first slot.

15. The mobile device as claimed in claim 12, wherein the feeding element is coupled through the circuit element to the host upper cover or the first metal partition.

16. The mobile device as claimed in claim 1, wherein the H-shaped slot antenna has a first resonant path from a first end of the first slot through the connection slot to a first end of the second slot, and wherein the first resonant path is excited to generate the first frequency band.

17. The mobile device as claimed in claim 1, wherein the H-shaped slot antenna further has a second resonant path from a second end of the first slot through the connection slot to a second end of the second slot, and wherein the second resonant path is excited to generate the second frequency band.

* * * * *